(12) United States Patent
Mueller et al.

(10) Patent No.: US 12,008,679 B2
(45) Date of Patent: Jun. 11, 2024

(54) MEASUREMENT METHOD, MEASUREMENT SYSTEMS AND AUXILIARY MEASUREMENT INSTRUMENTS FOR DISPLAYING DESIRED POSITIONS IN A LIVE IMAGE

(71) Applicant: LEICA GEOSYSTEMS AG, Heerbrugg (CH)

(72) Inventors: Josef Mueller, Oberegg (CH); Oliver Faix, Diepoldsau (CH); Jochen Scheja, Hohenems (AT); Stefan Petkov, Flums (CH); Josef Lais, Marbach (CH); Tim Mayer, Horn (CH); Bernhard Metzler, Dornbirn (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 150 days.

(21) Appl. No.: 17/550,357

(22) Filed: Dec. 14, 2021

(65) Prior Publication Data

US 2022/0172406 A1    Jun. 2, 2022

Related U.S. Application Data

(63) Continuation of application No. 17/413,328, filed as application No. PCT/EP2018/084846 on Dec. 13, 2018.

(51) Int. Cl.
   *G06T 11/00*     (2006.01)
   *G01C 11/02*    (2006.01)
   (Continued)

(52) U.S. Cl.
   CPC .......... *G06T 11/00* (2013.01); *G01C 11/025* (2013.01); *G01C 11/08* (2013.01); *G06F 3/041* (2013.01);
   (Continued)

(58) Field of Classification Search
   CPC . G06T 11/00; G06T 7/70; G06T 2207/10028; G06T 2207/20104;
   (Continued)

(56) References Cited

U.S. PATENT DOCUMENTS

2002/0152053 A1   10/2002   Roy et al.
2002/0198736 A1   12/2002   Harrison
(Continued)

FOREIGN PATENT DOCUMENTS

CN         101365204 A     2/2009
CN         202906983 U     4/2013
(Continued)

OTHER PUBLICATIONS

Leica Geosystems AG, "Complete Laser Scanning System for Mine Surveying," https://www.laserscanning-europe. com/sites/default/files/Leica/HDS4400%20Flyer.pdf_Media.pdf, pp. 1-4 (2009).
(Continued)

*Primary Examiner* — Terrell M Robinson
(74) *Attorney, Agent, or Firm* — Maschoff Brennan

(57) ABSTRACT

A method and device for displaying desired positions in a live image of a construction site. The method mat include recording at least one position-referenced image of the construction site; linking at least one desired position to the position-referenced image; storing the position-referenced image together with desired position linkage in an electronic memory; recording a live image of the construction site, in particular in the form of a video, wherein the live image and the position-referenced image at least partially represent an identical detail of the construction site; retrieving the stored position-referenced image from the memory; fitting the position-referenced image with the live image, so that the desired position linked to the position-referenced image can be overlaid in a position-faithful manner on the live image;

(Continued)

and position-faithful display of the desired position as a graphic marking in the live image.

23 Claims, 15 Drawing Sheets

(51) Int. Cl.
  G01C 11/08 (2006.01)
  G06F 3/041 (2006.01)
  G06T 7/70 (2017.01)
  G06V 10/74 (2022.01)
(52) U.S. Cl.
  CPC ............... *G06T 7/70* (2017.01); *G06V 10/74* (2022.01); *G06T 2207/10028* (2013.01); *G06T 2207/20104* (2013.01)
(58) Field of Classification Search
  CPC ....... G01C 11/025; G01C 11/06; G01C 11/08; G06F 3/041; G06V 10/74; G06V 10/16; G06V 20/20
  See application file for complete search history.

(56) References Cited

U.S. PATENT DOCUMENTS

| | | | | |
|---|---|---|---|---|
| 2005/0057745 | A1* | 3/2005 | Bontje | G01C 15/002 356/139.03 |
| 2005/0274879 | A1* | 12/2005 | Osaragi et al. | E02F 3/847 250/231.13 |
| 2006/0192946 | A1 | 8/2006 | Walser | |
| 2008/0154538 | A1* | 6/2008 | Stathis | G06T 7/33 702/152 |
| 2009/0222237 | A1* | 9/2009 | Otani | G01C 1/04 702/152 |
| 2010/0128565 | A1 | 5/2010 | Golparian | |
| 2010/0303300 | A1* | 12/2010 | Svanholm | G01C 1/04 348/135 |
| 2011/0043515 | A1* | 2/2011 | Stathis | G01C 15/002 434/118 |
| 2013/0073366 | A1 | 3/2013 | Heath | |
| 2013/0326892 | A1* | 12/2013 | Schorr | G01C 15/008 33/286 |
| 2014/0081611 | A1 | 3/2014 | Robertson | |
| 2014/0300886 | A1 | 10/2014 | Zogg et al. | |
| 2015/0219455 | A1 | 8/2015 | Jordil | |
| 2015/0253137 | A1 | 9/2015 | Jensen et al. | |
| 2016/0258752 | A1 | 9/2016 | Hornung | |
| 2017/0109931 | A1 | 4/2017 | Knorr et al. | |
| 2017/0256097 | A1 | 9/2017 | Finn et al. | |
| 2017/0337743 | A1* | 11/2017 | Metzler | G01C 1/04 |
| 2018/0143756 | A1 | 5/2018 | Mildrew et al. | |
| 2018/0347980 | A1* | 12/2018 | Kotzur | G01C 15/008 |
| 2019/0094021 | A1* | 3/2019 | Singer | G01C 15/008 |

FOREIGN PATENT DOCUMENTS

| | | |
|---|---|---|
| CN | 206321246 U | 7/2017 |
| JP | 2002-098527 A | 4/2002 |

OTHER PUBLICATIONS

International Search Report in Application No. PCT/EP2018/084846 dated Nov. 7, 2019.
Helmut Eckert Ed—Darl Kuhn: "Information / Kommunikation", IP.com, IP.com Inc., West Henrietta, NY, US, Jul. 23, 2003.

\* cited by examiner

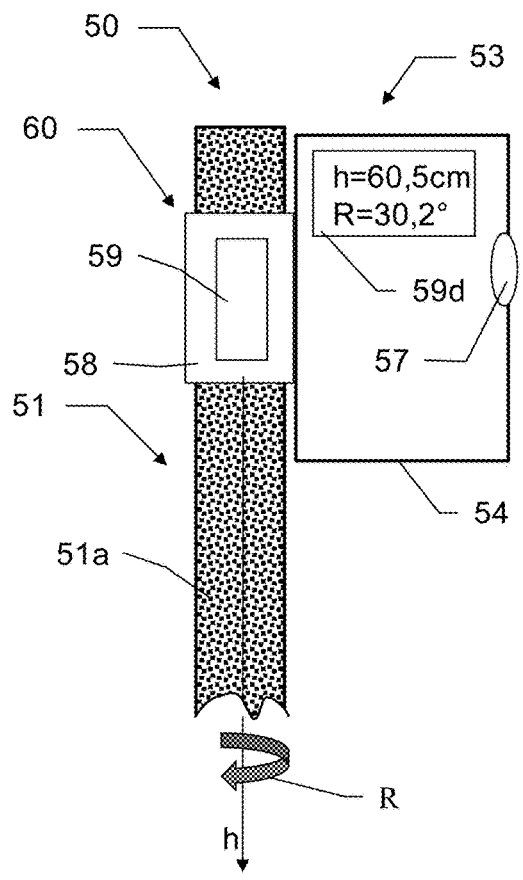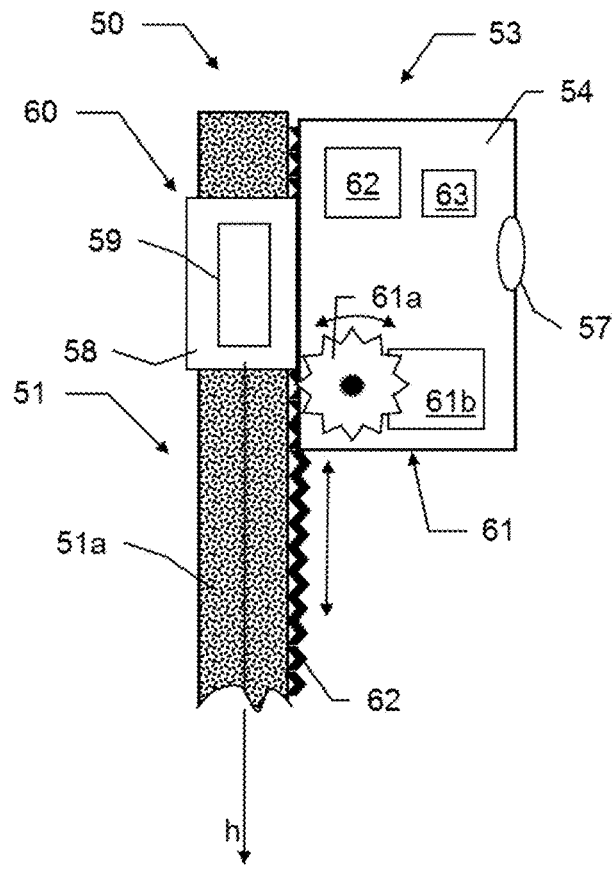
Fig 9
Fig 10

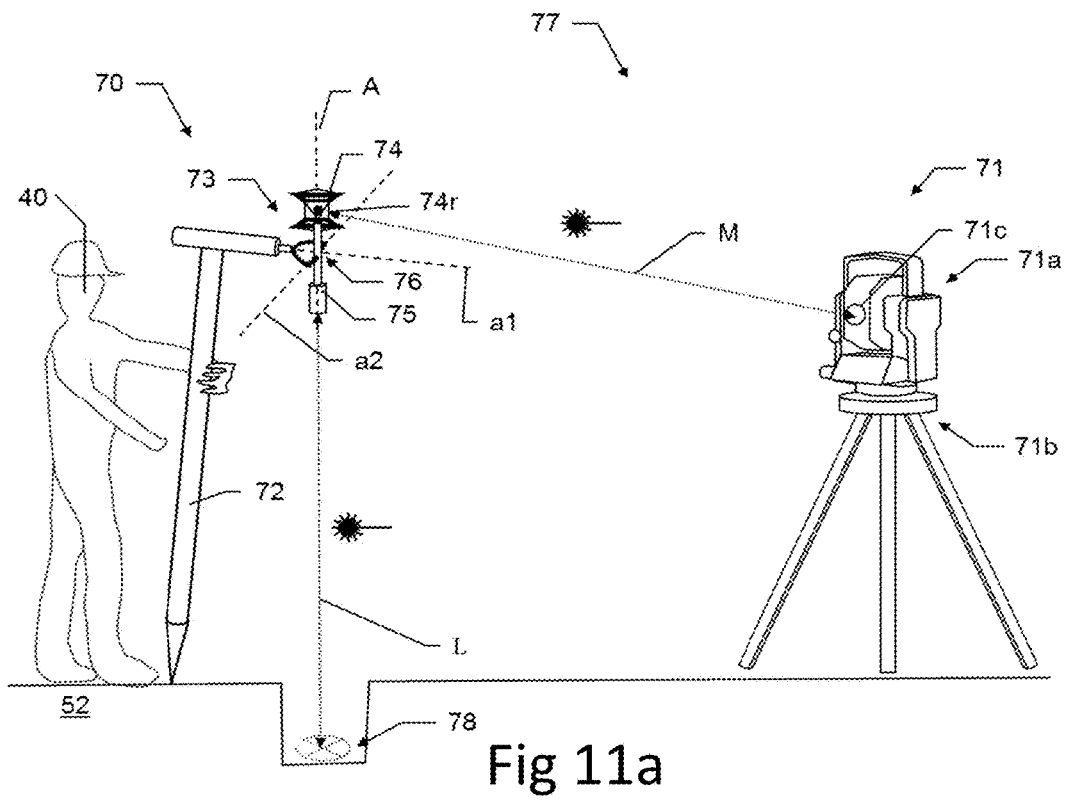
Fig 11a
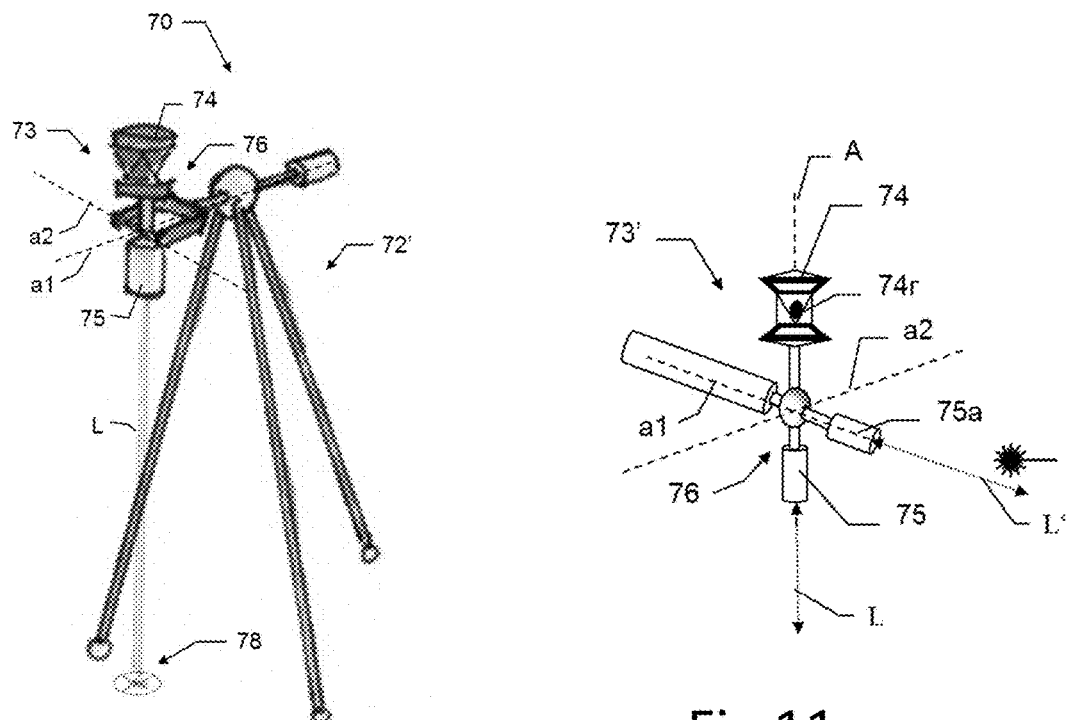
Fig 11b
Fig 11c

MEASUREMENT METHOD, MEASUREMENT SYSTEMS AND AUXILIARY MEASUREMENT INSTRUMENTS FOR DISPLAYING DESIRED POSITIONS IN A LIVE IMAGE

BACKGROUND

The invention relates to measurement methods as well as measurement systems and surveying devices or auxiliary measurement instruments.

Surveying systems for determining positions in the field of geodesy, in industry or in the region of construction sites or construction are known in manifold forms. Examples of this are systems made up of a stationary surveying device having direction and distance meter, for example a total station or a laser tracker, and an auxiliary measurement instrument marking a point to be measured or identified, for example a prism pole. Systems made up of a stationary laser emitter, which generates a position reference by means of a laser beam are also known. Surveying or marking activities are thus carried out by the interaction of a stationary device having a known location and thus offering a position reference with a receiving or marking or targetable auxiliary measurement instrument, whereby the position of individual terrain points such as land surveying points or points on construction site objects, for example in the interior or exterior region of buildings or in road construction, can be precisely determined with respect to position measurement or staking out.

SUMMARY

The object of the present invention is to provide an improved surveying system or improved system device and improved measurement method.

This object is achieved by the implementation of the characterizing features of the independent claims. Features which refine the invention in an alternative or advantageous manner can be inferred from the dependent claims and the description including the description of the figures. All embodiments of the invention illustrated or otherwise disclosed in this document are combinable with one another, if not expressly indicated otherwise.

In a first aspect, a method for displaying desired positions in a live image of a construction site. The method includes recording at least one position-referenced image of the construction site, linking at least one desired position with the position-referenced image, and storing the position-referenced image including desired position linkage in an electronic memory. Position reference means that a position is uniquely assigned or at least assignable to the construction site image and/or at least one element of the construction site imaged therein.

In further method steps, a live image of the construction site is recorded, in particular in the form of a video, wherein the live image and the position-referenced image at least partially represent an identical detail of the construction site, retrieving the stored position-referenced image from the memory, fitting the position-referenced image with the live image, so that the desired position linked to the position-referenced image can be overlaid in a position-faithful manner on the live image, and a position-faithful indication of the desired position as a graphic marking in the live image. At least one known "location mark" recognizable in or by means of the live image or an "anchor point" is provided with the position referencing by the position-referenced image, which enables locating of the live image or in the live image. Therefore, for example, in a live image of the construction site recorded by means of a smart phone, a planned position, for example a drilled hole to be executed, can be visualized exactly where it is actually to be located, which enables a very simple and clear transfer or "translation" of a construction plan into the (virtual) reality on location.

In the scope of the method, the linkage of the at least one desired position optionally takes place in the form of an image layer overlaid on the position-referenced image having graphic markings of the desired position and the position-faithful display of the at least one desired position in the live image is carried out by overlaying the image layer in the live image. In the live image, the desired position is thus established in an image layer which is displayed in a position-faithful manner in the live image.

As a further option, the at least one position-referenced image is recorded by means of a surveying device, which has a distance and direction measuring functionality and/or the live image of the construction site is recorded and displayed by means of a handheld mobile device, in particular a smart phone.

The fitting of the images is optionally carried out by means of template matching, preferably using marking objects attached for this purpose in the construction site and depicted both in the position-referenced image and also in the live image. As a further option, regions are graphically marked in the live image which cannot be matched, so that the user is made aware of such regions.

In particular, the desired position is used to execute a construction activity, wherein an actual status image of the construction site is recorded after completed construction activity, a position referencing of the actual status image is carried out on the basis of the position-referenced image, and the position-referenced actual status image is stored in the memory, wherein the position-referenced actual status image is then optionally itself used as the position-referenced image for a possible renewed or future performance of the method, and replaces, for example, the original or "old" position-referenced image. The accuracy of the position reference of the actual status image can also be estimated, in particular on the basis of distinctive construction site elements depicted therein, and if an accuracy below a defined threshold is present, a warning can be automatically output to a user, for example a notification in the live image. For example, a cumbersome manual measuring/staking out of desired positions can thus be omitted.

In one refinement of the method, the position-referenced image and the live image are three-dimensional images (which are also understood to include point clouds, for example), in particular wherein the live image is recorded using a range image camera or photogrammetry camera, for example according to the time-of-flight principle, by means of waveform digitizing (WFD) or stereophotogrammetry.

Moreover, optionally in addition to the desired position, further data relating to the desired position, in particular a construction drawing and/or a link to a database, are linked to the position-referenced image, stored in the memory, and displayable in the live image, so that a user can retrieve additional items of information on the desired position in the live image.

The live image is optionally compared to the position-referenced image in such a way that construction site elements are recognized in the live image which are not depicted in the position-referenced image or are depicted at an incorrect point in the live image, wherein such recognized construction site elements are graphically marked in the live image.

As a further option, the method is specifically designed for planar structures, so that the position-referenced image and the live image essentially represent an area of the construction site, in particular a building area.

Moreover, this aspect relates to a computer program product having program code, which is stored on a machine-readable carrier, for executing this method, in particular by means of a mobile computer terminal.

In a second aspect, a measurement system having surveying functionality. The measurement system includes in this case a surveying device, which can be absolutely located in a room-based manner, for example by means of GPS or measuring position reference points and is in particular stationary, and which is room-based, for example ground-based or fastened on a wall or ceiling.

Furthermore, the measurement system includes a handheld auxiliary measurement instrument, wherein the auxiliary measurement instrument includes a handheld carrier and a mobile computer terminal, which is supported by the carrier and includes a display screen and a camera, in particular a smart phone and/or tablet.

Moreover, auxiliary measurement instrument and surveying functionality are designed in such a way that upon execution of the surveying functionality, a pose (position and alignment, 6-DoF) of the auxiliary measurement instrument and thus the computer terminal relative to the surveying device is uniquely determinable.

Upon execution of the surveying functionality, the pose of the auxiliary measurement instrument and thus of the computer terminal relative to the surveying device is uniquely determined, wherein at least one pose-dependent degree of freedom (i.e., a degree of freedom which is dependent on the location of the auxiliary measurement instrument relative to the surveying device), in particular the distance between auxiliary measurement instrument and surveying device, is determined by the surveying device. Furthermore, a measurement environment image is recorded by means of the camera of the computer terminal and the measurement environment image is displayed on its display screen, wherein at least one measurement point of the measurement environment image is displayed overlaid in a position-faithful manner using the determined location of the computer terminal.

The auxiliary measurement instrument preferably includes, as means for determining or making determinable its poses on the carrier, a body, which is in particular spherical or polyhedral, having optical one-to-one code distributed on the body surface, wherein decoding is carried out by means of image processing of an image of the body recorded by a second camera arranged on the surveying device in such a way that the orientation and distance of the carrier relative to the surveying device are determined one-to-one, the direction of the target axis aligned on the auxiliary measurement instrument is determined, and the pose of the auxiliary measurement instrument is determined on the basis of the orientation, distance, and target axis direction.

In one refinement, the surveying functionality is designed in such a way that, by means of the computer terminal, the position of at least one environmental measurement point is measured relative to the computer terminal and the absolute position of the environmental point is ascertained on the basis of this position of the measurement point and the ascertained pose of the auxiliary measurement instrument.

The auxiliary measurement instrument is thus used as an "extended" arm of the absolutely located surveying device, wherein the auxiliary device is mobile, so that, for example, points in the room which cannot be surveyed from the surveying device can be surveyed with absolute precision and easily and conveniently thanks to the display screen assistance.

As a further option, the surveying functionality is designed in such a way that in a (live) image of the measurement environment recorded by means of the camera and displayed in the display screen, the environmental point to be surveyed is selected manually by a user, and/or additional information (for example measurement accuracy) and/or a data link relating to a measurement point is displayed.

The surveying functionality can also be designed in such a way that a scanning position determination of a plurality of environmental points takes place, for example in that the computer terminal is pivoted during progressive point surveying. A 3D point cloud can thus be generated, for example.

The environmental point position is preferably measured by the computer terminal based on a measurement beam, in particular by means of an electronic laser distance meter, and/or by photogrammetry, in particular by means of a camera of the computer terminal designed as a double camera or by means of photogrammetric image recording on the basis of a camera in two positions/perspectives.

As a further option, the auxiliary measurement instrument includes at least one marker for directed marking and the surveying functionality is designed in such a way that on the basis of the absolute locating of the surveying device and the ascertained relative location of the auxiliary measurement instrument, at least one measurement point to be staked out is marked in the correct position on a surface of the measurement environment by means of the marker, for example in that the marker is designed as a light source, designed in particular as part of the computer terminal, for directed emission of visible light and the measurement point is marked by means of light projection on the measurement environment surface. The marker is designed, for example as a point and/or line laser, so that a desired position can be made visible in the correct position as a laser light spot or line on a wall, for example. Alternatively or additionally, the marker can be designed as a printer or a spray device and a desired position is marked by means of application of a physical marking, in particular a color marking, on the measurement environment surface.

The carrier preferably includes a gimbal mount for location stabilization. It is preferably active, i.e., automatically movable, wherein this is used to adjust an alignment of the computer terminal in a targeted manner. The computer terminal may thus optionally automatically be aligned on a measurement point to be staked out or surveyed, for example, as described above to then mark or survey it. A measurement point to be surveyed is optionally selected here (for example tapped) by the user on the display screen in the measurement environment image and the computer terminal automatically aligns its target axis accordingly by means of the active gimbal mount and surveys the selected measurement point. The pose stabilization is optionally used, for example, for the targeted alignment on the earth or another point vector with known location.

As a further option, the auxiliary measurement instrument includes an inertial measurement unit (IMU) and the surveying functionality is designed in such a way that the measurement data of the inertial measurement unit are used in the determination of the relative pose of the auxiliary measurement instrument. The IMU can be used in particular to bridge times in which orientation and/or distance of the auxiliary measurement instrument are not ascertainable by means of the surveying device, for example due to interruption of the line of sight between surveying device and code body.

The carrier optionally includes a locking mechanism, in particular a stand and/or clamp, with the aid of which the auxiliary measurement instrument is fixable and releasable again in the measurement environment without tools, for example on a wall. As a further option, the carrier includes a joint, so that by means of the joint the arrangement of the computer terminal, and in particular at the same time also the body, is adjustable relative to the carrier. In some locations, for example, this can facilitate or make possible at all the targeting of an environmental point for surveying.

In addition, this aspect relates to a method for the described surveying system. The method comprises absolute locating of the surveying device, aligning the surveying device on the auxiliary measurement instrument, determining the alignment, determining the pose of the auxiliary measurement instrument relative to the surveying device on the basis of the means for determining and/or making determinable the pose, and displaying faithfully in position at least one measurement point overlaid on a measurement environment image recorded by the computer terminal on the display screen.

Moreover, this aspect relates to a computer program product having program code, which is stored on a machine-readable carrier, for executing this method, in particular by an above-described measurement system.

Furthermore, this aspect relates to a handheld auxiliary measurement instrument prearrangement having a carrier, preferably having location-stabilizing gimbal mount, a handheld single-hand handle, wherein the carrier is designed for the location-defined accommodation of an electronic, mobile display device, which includes a display screen and a camera, for example a smart phone and/or tablet. Furthermore, the carrier includes means for determining and/or making determinable a pose of the auxiliary measurement instrument prearrangement.

The auxiliary measurement instrument prearrangement is provided to form a measurement system by means of the computer terminal and using a ground-based surveying device which can be absolutely located, wherein the pose of the auxiliary measurement prearrangement relative to the surveying device is ascertainable on the basis of the means.

A third aspect relates to a method for surveying a target located in a measurement environment using a surveying device, which is located or positioned at a location in the measurement environment and includes a distance and direction measuring functionality and a target axis, in particular a total station. The method includes the following steps: recording an overview image of the measurement environment, in particular a 360° panoramic image, from the location of the surveying device, displaying the overview image on a display screen, manually selecting a target region containing the target on the basis of the overview image, and automatically aligning the target axis in the direction of the target region.

Furthermore, in the scope of the method, an image of the target region is recorded, which corresponds to an enlarged detail from the overview image, by means of a camera of the surveying device aligned in the direction of the target axis (for example by means of an on-axis camera), the target is manually selected on the basis of the target region image, the target axis is automatically aligned in the direction of the selected target, and the target is surveyed by the surveying device thus aligned on the target by means of the distance and direction measuring functionality.

Thus, on the basis of a "global" large-scale overview image—which is preferably recorded by means of the camera aligned in the direction of the target axis itself—firstly a target region is manually defined (for example by spanning a window with two fingers in a touchscreen), after which a first, rough alignment of the surveying device on the target takes place. In the rough, approximate alignment, a second, more targeted image is then recorded, in that the target is again selected manually by the user (for example by pressing on a point by means of a touchscreen), so that the target axis is aligned finely/accurately on the target on the basis of this manual target selection, so that it can be surveyed. In the case of a touch-sensitive display screen, it can be designed for manipulating measurement data by means of gesture control.

In one advantageous refinement, the user is automatically assisted in that during the manual selection of the target region by touching the display screen, a region around the contact point in the overview image is automatically defined, wherein the size of the region is automatically established as a function of measurement data, in particular a distance to the target region, and/or the region is variable in steps by multiple touches, for example 2-finger zoom, of the contact point; and/or in that a zone around the contact point in the target region image is activated by the touch, and the target is automatically recognized and selected within this zone, and thus the target selection is automatically assisted.

A zoom function, in particular a display screen magnifying glass, is optionally automatically activated to define the target region and/or select the target.

Moreover, this aspect relates to a computer program product having program code which is stored on a machine-readable carrier for executing this method, in particular by a surveying device having a distance and direction measuring functionality.

Furthermore, this aspect relates to a surveying system which is room-based, thus, for example, ground-based or stationed on a wall or ceiling. The surveying system includes a surveying device, which is stationary in particular, in particular a total station, having a distance and direction measuring functionality, whereby a distance and direction to a target to be surveyed in a measurement environment of the surveying device is determinable in the direction of a target axis of the surveying device. Furthermore, the surveying device includes at least one drive for automatically pivoting the target axis, and at least one camera aligned in the direction of the target axis, in particular an on-axis camera, by means of which an image of a detail of the measurement environment is recordable. The surveying system additionally includes a display screen and a controller having evaluation functionality.

The controller includes a target acquisition function, upon the execution of which an overview image of the measurement environment is recorded, in particular a 360° panoramic image, from the location of the surveying device, in particular by means of the camera aligned in the direction of the target axis, and the overview image is displayed on the display screen. Furthermore, in the scope of the target acquisition function, a manual selection of a target region containing the target on the basis of the displayed overview image by a user is registered, the target axis is automatically aligned in the direction of the target region by means of the drive on the basis of the registered manual definition as a rough alignment on the target, and then an image of the target region is recorded, which corresponds to an enlarged detail from the overview image, by means of the camera aligned in the direction of the target axis.

By means of this (second) image, a manual selection of the target is registered, the target axis is automatically (finely) aligned in the direction of the selected target (i.e., on the target) by means of the drive on the basis of the registered manual target selection, so that the target can be surveyed by means of the distance and direction measuring functionality.

The surveying device optionally includes a base, a targeting unit defining the target axis and pivotable in relation to the base around at least one axis, in particular two axes orthogonal to one another, in particular a telescopic sight, at least one angle meter, and an angle measuring functionality for measuring the alignment of the target axis, a distance meter for measuring a distance to the target along the target axis, and a controller having single-point determination functionality, upon the execution of which a spatial position of the target is determined controlled by the controller based on the measured alignment of the target axis and the distance between target and surveying device. The targeting unit preferably includes a radiation source for generating a measurement radiation and optical unit for emitting the measurement radiation as a free beam in the direction of the target axis as well as an electrooptical detector for detecting measurement radiation reflected from the target, from which the distance to the target is determinable.

The display screen is optionally designed for operating the surveying device and for displaying and manipulating measurement data, wherein the display screen and the surveying device are separate units or the display screen is designed to be separable from the surveying device. Furthermore, the surveying system can comprise an auxiliary measurement instrument for physically marking the target, in particular a surveying pole with retroreflector.

A fourth aspect relates to a construction laser, for example a line laser, having a self-leveling—for example by means of a gimbal mount or a ball joint—laser module including a laser source and an emitting optical unit, wherein the emitting optical unit is designed for the punctiform or linear emission of laser radiation of the laser source, for example as a line by means of widening/expansion of the laser beam or its rapid pivoting/rotation (in a plane). Furthermore, the construction laser includes a housing having a locking mechanism (fixing mechanism), which is provided for the releasable fixation of the housing at a height above a reference surface, for example the floor of a room.

According to another aspect, the construction laser includes a distance and/or position meter, which is designed to automatically measure the height above the reference surface.

The distance and/or position meter is optionally designed as a laser distance meter, wherein preferably the laser source is also used to provide laser radiation for the laser distance meter. Alternatively or additionally, the distance and/or position meter is designed as a read head, provided for reading a position coding, which is absolute in particular. I.e., the height is measured as the distance to the floor, for example by means of laser runtime or phase measurement and/or the height is read off by a read head from a measuring standard coding the height.

If it is designed as a read head, it is optionally integrated into the locking mechanism and/or designed as an optoelectronic or capacitive read head. As a further option, the alignment of the housing in the horizontal plane is also measurable by means of the distance and/or position meter or an additional alignment meter, so that a rotational position around the vertical axis is also measurable.

The housing preferably includes a drive and the locking mechanism is designed as an automated locking mechanism, so that the height is adjustable in an automated manner, wherein the drive is optionally also designed to change the horizontal alignment in an automated manner.

The height change and possibly also the alignment change by means of the drive optionally take place automatically in that the construction laser includes a controller which is designed to automatically adjust the height and to automatically fix the housing at a target height, possibly with a target alignment.

In embodiments having a drive, the construction laser can also include a remote control receiver and can be designed in such a way that the height and in particular also the alignment of the housing in the horizontal plane is adjustable via remote control.

As a further option, the construction laser includes a communication module, so that the respective measured height is transmittable to an external device, in particular a remote control.

The present aspect relates to a construction laser system having a construction laser and a holder, which is pole-shaped in particular, wherein the construction laser includes a laser module which includes a laser source and an emitting optical unit and is self-leveling, in particular by means of a gimbal mount or a ball joint, wherein the emitting optical unit is designed for punctiform or linear emission of laser radiation. Furthermore, the construction laser comprises a housing having a locking mechanism, which is provided for the releasable fixation of the housing on the holder, so that the housing is fixable on the holder flexibly at various heights above a reference surface.

According to another aspect, the system includes a position encoder, which is absolute in particular, for the automated measurement of the respective height of the housing above the reference surface.

The holder optionally includes an active part of the position encoder and the construction laser includes a passive part complementary thereto, for example a magnet as a position-indexing target. I.e., a position value is determined or read out on the part of the holder. This has the advantage that the construction laser can be kept simple, has no or hardly any additional weight, and has no or hardly any additional power consumption. Alternatively, the holder is passive and includes, for example, an optical position code provided for the height measurement.

In one refinement of the system, the position encoder is designed in such a way that in addition to the height, an alignment of the housing relative to the holder is also measurable, in particular for which the holder includes an optical area code for this purpose, which codes a further axis in addition to the vertical axis.

The system optionally includes a drive and the locking mechanism is designed as an automated locking mechanism, so that the housing is vertically adjustable and fixable in an automated manner, in particular wherein the drive is designed in such a way that in addition to the height, an alignment of the housing relative to the holder is also adjustable in an automated manner. The drive is designed, for example, in such a way that the holder is active and the construction laser is passive with respect to the drive, wherein the drive is designed, for example, as a magnetic linear drive. With such a passive construction laser, its power consumption could thus advantageously be kept low.

In such embodiments having a drive, the system moreover preferably includes an electronic controller which is designed in such a way that the housing is automatically fixable at a predetermined desired height by means of the drive and the locking mechanism and on the basis of the respective measured height. In embodiments which, as described above, furthermore include a two-axis drive and a two-axis coding/two-axis encoder, the controller is preferably also designed to automatically adjust the second axis. Alternatively or additionally, the system includes a remote control receiver and is designed in such a way that the height, and in particular also an alignment of the housing, is adjustable via remote control.

The present aspect relates to a method for setting a target height of a construction laser system according to the above description, wherein the target height is set automatically by the system and/or by a user by means of remote control on the basis of the respective height measured by the position encoder.

As an additional option, in the scope of the method, the construction laser is additionally aligned in such a way that, knowing a distance to a vertical wall of the construction laser environment, targeted setting of the emission direction of the laser fan is carried out in such a way that a reference line formed by the laser fan on the vertical wall is placed in a targeted manner both in the horizontal direction and also in the vertical direction.

This aspect relates to a computer program product having program code, which is stored on a machine-readable carrier, for executing the method as claimed in one of the claims, in particular by a construction laser system.

Another aspect relates to a portable or handheld geodetic auxiliary measurement instrument, designed to form a surveying system for surveying and/or staking out a terrain point with a geodetic surveying device, which is stationary in particular, including distance and direction measuring functionality, in particular a total station.

The auxiliary measurement instrument includes a handheld pole having a ground contact end. Alternatively or additionally, the instrument includes a tripod. The auxiliary measurement instrument can be positioned or set up at the terrain point by means of the pole and/or the tripod. Furthermore, the auxiliary measurement instrument includes a target that can be targeted by the surveying device, for example a retroreflector, wherein the target includes a position reference point located along a longitudinal axis.

In addition, the instrument includes a targeting unit having a target axis for targeting the terrain point, wherein the target axis corresponds to the longitudinal axis of the target or is perpendicular thereto, and wherein the target and the targeting unit are arranged in an assembly supported by the pole and/or the tripod.

The assembly is mounted in a motor-driven and actively controlled gimbal mount having two gimbal axes, wherein the vertical axis of the target and the target axis of the targeting unit are alignable, by means of the gimbal mount, vertically or horizontally independently or automatically upon positioning at the terrain point.

I.e., the assembly is fastened on or in a gimbal mount mounted on two axes, which includes a drive, for example a direct drive, for actively moving the mount around the two axes and thus in turn moving the assembly. The auxiliary measurement instrument is designed in such a way that the active gimbal mount is controllable so that by means of extension/retraction of a corresponding position of the assembly, the target vertical axis and the target axis are automatically aligned vertically or horizontally when the instrument is at the desired terrain point. In addition, by means of the active gimbal mount, if needed the vertical or target axis can be deliberately set on further desired or predetermined alignments, for example in order to provide alignment specifications determined using the targeting unit.

The active gimbal mount preferably includes adaptive damping. The damping provided by the mount may thus be adapted actively and preferably automatically to measurement conditions. I.e., for example, a movement of the assembly can be compensated for in an optimized manner, for example depending on strength or frequency. The damping is thus also adaptable, for example, to the weight of the target, which is advantageous in particular in the case of auxiliary measurement instruments which can accommodate target bodies of different weights. The target is optionally arranged in such a way that the position reference point is located in the intersection point of the two axes of the gimbal mount. As a further option, the assembly is arranged with an offset to the pole and/or the tripod center, so that the vertically aligned target axis is targeted on a terrain point on the ground unobstructed by the pole or tripod. As a further option, the mount includes at least one inclination sensor. Thanks to the active two-axis gimbal mount, such an inclination sensor can be approached and leveled with high accuracy and small measurement range.

The targeting unit is preferably designed for marking the targeted terrain point and/or measuring the distance between the position reference point and the targeted terrain point. I.e., the targeting unit is used to display a desired point in the terrain (marking) and/or to measure the position of a point present in the terrain. For this purpose, the targeting unit optionally includes a laser for emitting a laser beam in the direction of the target axis, wherein the laser beam is used for marking the terrain point and/or for measuring the distance to the terrain point. For the distance meter, the targeting unit optionally includes an electronic distance meter, for example designed as a triangulation scanner or a time-of-flight camera.

Furthermore, the targeting unit can be designed for emitting a second laser beam, for example by means of a second laser or by splitting off a partial beam of the first laser beam. The emission direction of the second laser beam is optionally perpendicular to the target axis. As a further option, the targeting unit includes an optical unit, by means of which the first and/or second laser beam is emitted in a punctiform or linear manner (thus as a line laser, for example). As a further option, the targeting unit is designed to project two-dimensional images on a surface of the environment by means of the first and/or second laser beam or an additional light source.

The targeting unit optionally includes a camera aligned in the direction of the target axis, so that an image of the terrain point is recordable therewith. The camera is optionally used, in the scope of a visualization functionality, in order to record an image of the terrain point (or an image of the measurement environment that includes the terrain point), to generate an augmented reality image in that a graphic marking the terrain point is overlaid faithfully in position on the recorded image, and to display the augmented reality image on a display, which is external in particular, for example augmented reality glasses.

In one refinement, the assembly includes a target tracking unit, designed for progressively tracking a target device moving relative to the auxiliary measurement instrument, for example a conventional prism pole. The target tracking unit can be, for example, ATR-based (automated target recognition; see also description of FIG. 14) for tracking retroreflective target devices, as known in principle from the prior art, and/or camera-based for other devices.

This aspect relates to a surveying system having a geodetic surveying device, which is stationary in particular and includes distance and direction measuring functionality, in particular a total station, and an above-described auxiliary measurement instrument, wherein preferably the system includes means for determining the orientation of the gimbal mount of the auxiliary measurement instrument relative to the surveying device. These orientation determination means are designed, for example, as optical markings/patterns/codes on the auxiliary measurement instrument, for example LED arrangements or a 3D body, for example a ball having optical code on the surface, which can be acquired and evaluated by a camera on the surveying device (see also description on the second aspect).

Furthermore, this aspect relates to a method for checking the alignment of a handheld tool which includes an operating axis and, on a rear side, a laser detector or a matte disk located on the operating axis, with the aid of such an auxiliary measurement instrument, which includes a laser for laser beam emission in the target axis direction. In the scope of the method, the auxiliary measurement instrument is positioned at a terrain point so that the laser beam is incident on the terrain point and the tool, for example a drill, is applied at the terrain point. The alignment of the tool is then checked by aligning the operating axis of the tool so that the laser beam is incident on the detector or the matte disk of the tool within a defined central zone.

This aspect relates to a computer program product having program code which is stored on a machine-readable carrier, in particular of a handheld tool or a construction laser system, for executing the method as claimed in any one of the claims.

Another aspect relates to a surveying device, in particular designed as a total station or laser tracker, for the coordinative position determination of a target, in particular a retroreflector.

The surveying device includes a distance measuring module having a radiation source for generating measurement radiation, a detector for detecting measurement radiation reflected from the target, in order to determine the distance to the target based on detected measurement radiation.

Furthermore, the surveying device includes a direction measuring module having a light-sensitive position-sensitive sensor and a receiving optical unit for receiving optical radiation and guiding it onto the sensor. The sensor is sensitive in a specific infrared wavelength range in order to acquire infrared radiation originating from the target from this wavelength range, wherein a point of incidence of the acquired infrared radiation on the sensor is determinable and a direction to the target is ascertainable on the basis of the point of incidence. The target infrared radiation originating from the target is, as is known in the prior art, either emitted by the target itself or infrared radiation originating from the surveying device is reflected by the target, for example by means of a retroreflector.

According to this aspect, the receiving optical unit and the sensor are designed in such a way that, simultaneously with the acquisition of the infrared radiation, visible radiation having a spectral distribution sufficient to generate a color image is also receivable and acquirable by means of the sensor.

The surveying device is preferably designed in such a way that, in parallel to the determination of the direction to the target (on the basis of the infrared radiation), an image, in particular an RGB image of the target can be generated on the basis of the acquired visible radiation.

The sensor is optionally designed as a hybrid RGB-IR sensor. As a further option, the receiving optical unit includes at least one correction lens, by means of which the focal length of the receiving optical unit in the infrared range and the focal lengths in the visible range are matched with one another, so that an (at least substantially) sharp image can be present for both wavelength ranges simultaneously on the sensor. Alternatively or also additionally, the surveying device includes a partially automated or automated controller of the focus of the receiving optical unit, which is designed in such a way that the focus for the infrared radiation is set based on an evaluation of acquired visible radiation.

The surveying device optionally includes a base and a beam deflection unit pivotable by a motor relative to the base around at least one axis, which includes the distance measuring module and the direction measuring module and furthermore an angle measuring functionality for determining an alignment of the beam deflection unit relative to the base. As a further option, the beam deflection unit includes an infrared radiation source for illuminating the target using the infrared radiation and/or a pointer radiation source for emitting a visible pointer light beam (which is thus recognizable in an image generated by means of the sensor) coaxially to the measurement radiation.

As a further option, the surveying device includes a fine targeting and/or target tracking functionality, upon the execution of which an alignment of the surveying device to the target is automatically regulated on the basis of the direction determined (by means of the point of incidence), so that the target can be finely targeted and/or tracked (so-called tracking).

This aspect relates to a method using an above-described surveying device, wherein, in the scope of the method, a direction to the target is determined (so-called ATR measurement) in one alignment of the receiving optical unit to the target in one work step on the basis of target infrared radiation (i.e., infrared radiation originating from the target) received by means of the receiving optical unit and acquired by the sensor. Moreover, an image, in particular an RGB image, of the target is generated in the scope of the method on the basis of visible radiation received by means of the receiving optical unit and acquired by the sensor.

In this case, no change of the wavelength transmissibility of the receiving optical unit/the optical beam path is necessary to carry out both processes, so that, for example the infrared radiation can be acquired and the visible radiation can be acquired in the same sensor exposure procedure or image generation and ATR measurement can run simultaneously.

Alternatively to such a simultaneous procedure, the infrared radiation is acquired and the visible radiation is acquired in respective separate, successively occurring sensor exposure procedures. The exposure procedures optionally take place alternately in the scope of a video stream and/or the exposure is adapted in each case to the respective radiation, so that the sensor is optimally utilized, for example on the basis of the different exposure times for each radiation.

Optionally, the determined direction to the target is displayed overlaid in the image of the target, wherein the image is, for example, part of a live video stream. As a further option, target fine targeting and/or target tracking is carried out by the surveying device on the basis of the determined direction to the target.

As a further option, in the scope of the method, the image sharpness of the image is evaluated, and the focus is set for an acquisition of the infrared radiation taking place thereafter on the basis of the evaluation result.

This aspect relates to a computer program product having program code, which is stored on a machine-readable carrier, for executing the method as claimed in any one of the claims, in particular by a surveying device having direction and distance measuring functionality.

Another aspect relates to a platform for selling and buying geodetic data via an open computer network, preferably via the Internet.

The platform includes means for receiving geodetic data sent from an external device, in particular a geodetic surveying system, via the computer network, wherein the data include geodetically surveyed, absolute coordinates of at least one terrain point. The platform then includes means for storing the received geodetic data in association with the coordinates, i.e., the data are filed/stored according to their coordinates.

Furthermore, the platform includes means for providing at least one part of the stored geodetic data upon coordinate-related request by an external geodetic surveying system connected via computer network. This part of the data comprises at least the coordinates themselves and the provision is based on the coordinate association of the stored data. Moreover, the platform includes means for sending the provided geodetic data to the requesting geodetic surveying system via the computer network.

The platform is optionally designed in such a way that the geodetic data can contain, in addition to the absolute coordinates of the terrain point, at least one of the following metadata on the coordinates (or the terrain point or the underlying surveying): measurement accuracy, measurement time, measurement technology and/or surveying device type, originator/source, point and/or object coding (for example identification as path boundary or hydrant), or coordinate history.

As a further option, the means for data provision are designed in such a way that upon request in the scope of the provision, a preselection from the stored geodetic data and/or an adaptation of the stored geodetic data takes place as a function of the device type and/or location of the first surveying system transmitted for this purpose on the platform.

The platform is optionally designed to link multiple surveying devices as a surveying group in such a way that geodetic data received from one of the surveying systems can be distributed in real time in the group, in particular automatically.

In one refinement, the platform is designed, upon the presence of first geodetic data of a terrain point and at least second geodetic data of the same terrain point, in particular originating from different data sources, to process these two sets of data in order to generate a statistic of the profile of the terrain point coordinates and/or to calculate a mean value from the at least two terrain point coordinates and to store this coordinate mean value as the coordinates that can be requested and/or to provide a comparative judgment of the reliability and/or quality of the first and second geodetic data, in particular wherein the judgment is generated automatically and/or by users of the platform.

The platform is optionally designed, in case of an update of stored geodetic data, to automatically generate an update message and send it via the computer network to a surveying system which has already downloaded this data. As a further option, the platform is connected via the Internet to a meteorological and/or seismological data provider and is designed in such a way that a warning message is linked to the geodetic data of the terrain point which indicates a possible deviation of the stored coordinates due to meteorological and/or seismological events from the real coordinates of the terrain point. I.e., if it is to be assumed due to the received meteorological and/or seismological data that the terrain point has or could have "moved" and thus the related coordinates could be out of date, this is automatically communicated to the user.

This aspect relates to a system made up of such a data platform and a geodetic surveying system, in particular a total station, wherein the system is designed in such a way that upload and/or download of geodetic data to or from the platform, respectively, can be carried out by a single surveying system user input, in particular by a single keypress or button press at the surveying device.

Furthermore, this aspect relates to a method for selling and buying geodetic data via a computer network platform.

The method comprises the steps: geodetic surveying of terrain points, so that geodetic data are generated, which at least include the absolute coordinates of the terrain points, uploading the geodetic data to a publicly accessible computer network geodetic data trade platform via the computer network as the sale of the geodetic data, storing the geodetic data in the platform, so that the geodetic data can be requested as a function of the coordinates. Furthermore, the method includes providing stored geodetic data upon coordinate-related request of the geodetic data via the computer network and downloading at least a selected part of the provided geodetic data via the computer network as the sale of the geodetic data, in particular wherein the downloading is carried out on/by a geodetic surveying system.

Optionally, the coordinate reference of the request is automatically produced in that the location of the requesting buyer is determined, in particular using a global navigation system, and the stored geodetic data of those terrain points are provided/offered for request, which are located at the location. I.e., a user or buyer does not have to manually input at which coordinates or at which surveying location he wishes to purchase already surveyed terrain points (geodetic data), rather his location is automatically determined in the scope of the method and communicated to the platform, which then itself searches out from the memory, on the basis of the received location coordinates, surveyed points located at the location. In general, coordinate-related request also means that a designation or a name of a measurement environment/a location is specified, for example in the form of an address specification (for example location, road). I.e., the geodetic data can also be stored as a function of or in association with the coordinates in such a way that they can be found or requested on the basis of a location designation input.

Optionally, in the scope of the method, upon request of geodetic data of a specific set of terrain points, a surveying location that matches with the set of the terrain points or is optimum is automatically proposed—based on the geodetic data.

As a further option, upon the request, a device type of a requesting surveying system is transmitted to the platform and geodetic data are provided matched with the device type. As a further option, in the scope of the provision of geodetic data of a terrain point, possible further terrain points adjoining the terrain point are proposed.

In one refinement of the method, a message is automatically sent to a buyer as soon as an update of already downloaded geodetic data exists and/or as a notification that already downloaded geodetic data have become out of date or probably out of date in the meantime, in particular due to environmental influences on the terrain point.

Moreover, this aspect relates to a computer program product having program code which is stored on a machine-readable carrier for executing this method.

The present invention is described in greater detail hereinafter on the basis of embodiments and application procedures schematically illustrated in the drawings.

BRIEF DESCRIPTION OF THE DRAWINGS

FIG. 9 shows a second example of a construction laser system, FIG. 10 shows a refinement of the preceding construction laser embodiments, FIG. 11a-c show embodiments of a surveying system having an auxiliary measurement instrument and a surveying device having a gimbal mount.

DETAILED DESCRIPTION

Figure 1:
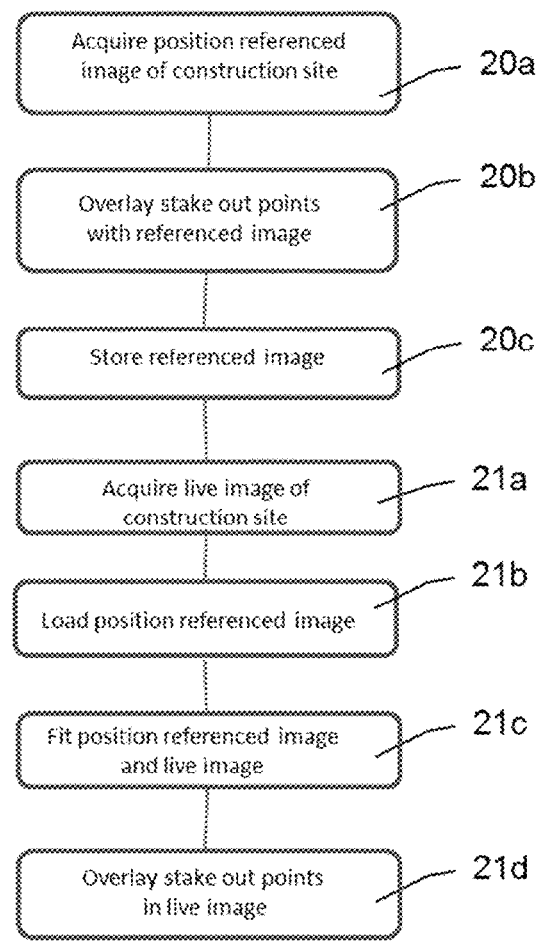
FIG. 1 schematically shows the sequence of the method for displaying desired positions in a live image of a construction site.

FIG. 1 schematically shows the sequence of the method for displaying desired positions in a live image of a construction site. In a step 20a, a position-referenced image of the construction site is recorded, for example the photograph of one or more building surfaces. Alternatively or additionally to a 2D image, a position-referenced 3D image of the construction site is created, for example a 3D point cloud is generated. The creation of a 2D or 3D image is carried out, for example, by a construction site surveyor or by means of a surveying device such as a total station or laser scanner. A position is uniquely assigned or at least assignable by means of the position reference to the construction site image or the elements of the construction site imaged therein.

In step 20b, desired positions or stake-out points are linked to the position-referenced image. For example, these positions are retrieved from a construction plan and overlaid on the position-referenced image faithfully positioned in a second image layer. The desired positions are thus connected to the image of the construction site in such a way that each desired or planned position, for example the positions of bore holes in walls, are retrievable faithfully positioned in the image.

In step 20c, the position-referenced image is stored together with the linkage of the desired positions or stake-out points in an electronic memory, for example a data cloud.

In step 21a, a live image of the construction site is recorded later. For example, a construction worker who wishes to be active at the construction site based on a desired position or a stake-out point records a photograph or a video image of the construction site on location by means of a mobile device such as a smart phone or tablet. The live image can be a 2D image or 3D image (for example a 3D point cloud) corresponding to the position-referenced image. A 3D image is recorded, for example, by means of a range image camera of the mobile handheld device.

The position-referenced image stored in step 20c is retrieved from the memory in step 21b. The live image and the referenced image are fitted in step 21c, which is carried out, for example, by means of template matching. Above all, in construction site regions having very little structure, the matching is optionally assisted in that targets or markings are attached at the construction site, for example a wall, and also imaged. The desired positions linked to the referenced image can then also be displayed faithfully positioned in the live image by means of graphic markings by the fitting of the two images, which takes place in step 21d. For example, the image layer having the stake-out points is overlaid faithfully positioned on the live image.

The method thus permits desired positions stored in a position-referenced manner by means of an image to be displayed faithfully positioned in an image of the construction site recorded on location. A user can therefore recognize in the live image, for example, at which points construction activities are to be performed on a wall, which thus permits him in a very simple manner, for example, to drill a hole exactly where this is planned, without having to inconveniently measure a desired position.

Figure 2:
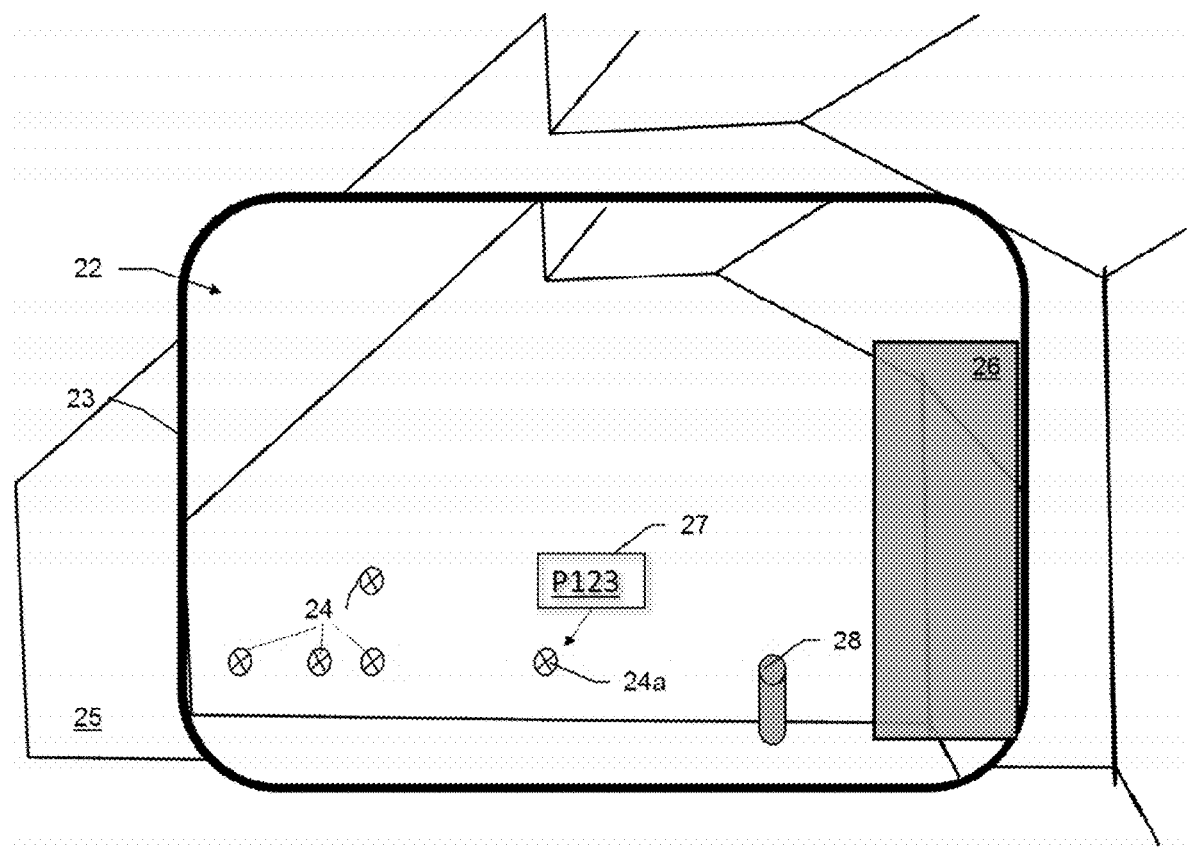
FIG. 2 shows an example of a live image of a construction site with indication of desired positions, FIG. 3a,b each show a refinement of the method.

FIG. 2 shows an example of a live image 22 of a construction site 25 having position-faithful display of desired positions 24, 24a. The live image 22 is recorded, for example using the camera of a tablet and displayed on the display 23 of the tablet. On the basis of the fit with a position-referenced image of the construction site 25 retrieved by the tablet, the desired positions 24, 24a are overlaid as graphic markings on the live image, for example in the form of an additional image layer, so that the user can recognize directly on the live image where on the construction site 25 the desired positions 24, 24a are located. Due to the position-faithful overlay, the graphic markings also follow faithfully in position, for example a position change of the tablet, i.e., a change of the alignment and/or the distance to the construction site or wall 25, so that the markings are progressively visible at the desired position in the display screen 23.

In the example, in addition a marking 26 is carried out of a region in the live image 22 which could not be fitted by the system with the stored reference image. This image region is masked by the marking 26. As a further option, in the example a graphic marking 28, for example in the form of a coloration, is carried out of a construction site element, which is present in the live image 22, but not in the position-referenced image. This change of the construction site since the creation of the position-referenced image is thus automatically recognized and displayed to the user by means of the graphic marking 28, so that the user can immediately recognize such changes. An optical marking of construction site elements which are not located in the live image 22 where they were expected or are supposed to be located also optionally takes place. The user can thus be made aware in the image 22 of installation errors, for example.

Furthermore, in the example stored data which relate to the desired positions 24a are displayed. In FIG. 2, this is symbolized by the text field 27, which indicates an identification number of the desired position 24a. Further such additional data are displayed, such as, for example, the tool to be used for the construction activity at the desired position or a link to the construction plan of the construction site 25.

Figure 3A:
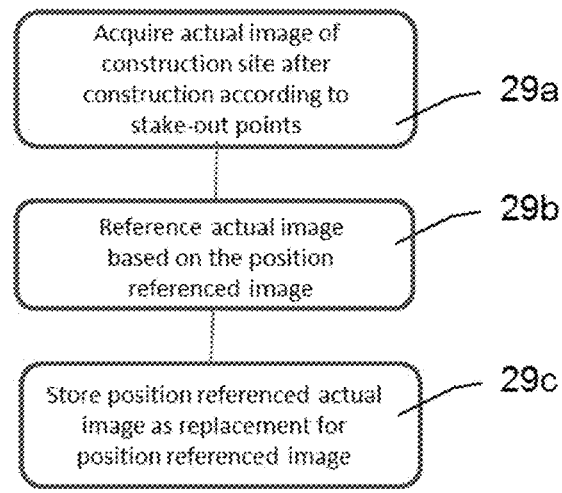

FIG. 3a schematically illustrates a refinement of the method. In a step 29a, an image of the actual status of the construction site is recorded, as is present after execution of construction activities performed on the basis of the desired positions. I.e., the actual status image documents the construction progress, for example at the end of a respective workday, and depicts construction site elements newly added by the construction work, for example newly laid lines or other installations.

This actual status image is then position referenced in a step 29b, wherein the already stored position-referenced image (cf. step 20c in FIG. 1) is used as the basis. For example, the position referencing of the current image is carried out by means of (image) features which are present both in the present image and also in the original position-referenced image. In other words, elements which are present in both images are recognized and matched.

In step 29c, the now position-referenced actual status image is stored in the memory, wherein it replaces the "old" position-referenced image that no longer corresponds to the actual status of the construction site. When the method is subsequently carried out again as described with respect to FIG. 1, the position-referenced actual status image is thus retrieved from the memory (corresponding to step 21b) and the live image of the construction site is fitted with the position-referenced actual status image (corresponding to step 21c). Alternatively, the "new" position-referenced image does not completely replace the "old" to indicate desired positions in a live image, rather both are used for these method steps, for example the original position-referenced image for unchanged image or construction site regions and the current position-referenced image for newly built regions. As a further option, the original (or a respective older) position-referenced image is used as a backup if problems occur with the position-referenced current (or most current) image.

Figure 3B:
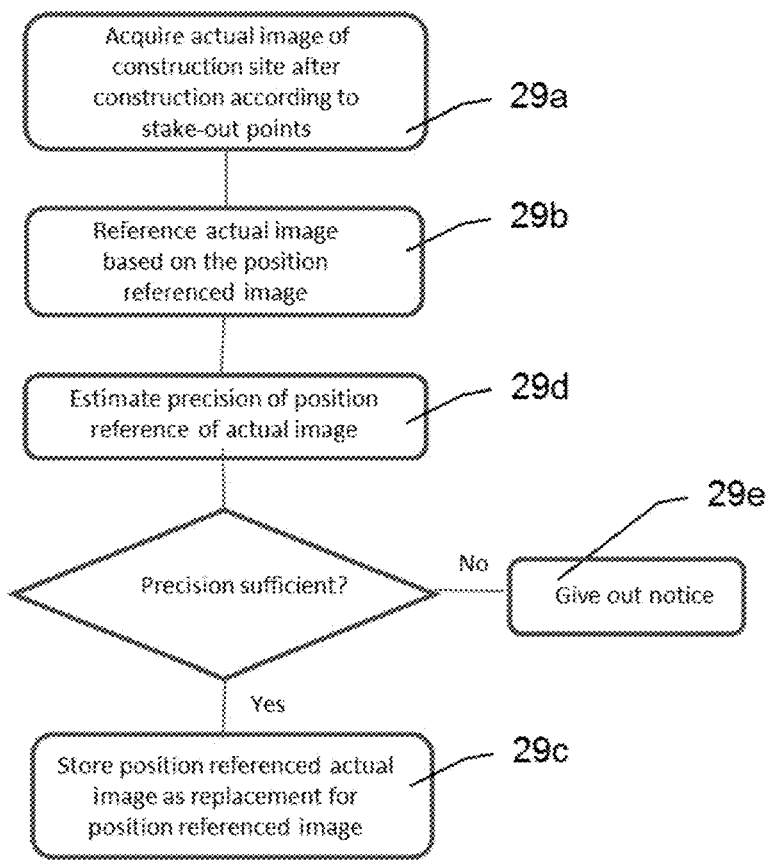

FIG. 3b schematically shows a refinement of the method according to FIG. 3a. FIG. 3b shows steps 29a and 29b corresponding to FIG. 3a at the top. In an additional step 29d, the precision of the position reference of the actual status image created in step 29b is now automatically assessed. This assessment is carried out, for example on the basis of feature quality and imaged changes in the image.

If the accuracy of the position reference is assessed to be adequate, the sequence continues with step 29c and the actual status image is stored. In contrast, if inadequate accuracy is established, the system outputs a message to the user in a step 29e. The user can react on the basis of this warning and, for example effectuate re-referencing of the position by a construction site surveyor or by means of a surveying device, as described for step 20a (see FIG. 1). It is ensured by this automatic check of the position reference precision that even in the case of many successive actual status images, which are recorded, for example, on many successive workdays, quality losses of the position reference do not fall below a minimum quality measure due to the referencing building on one another in each case on the basis of the preceding position-referenced image or countermeasures can be taken upon falling below an accuracy threshold by "refreshing" the position reference.

Figure 4:
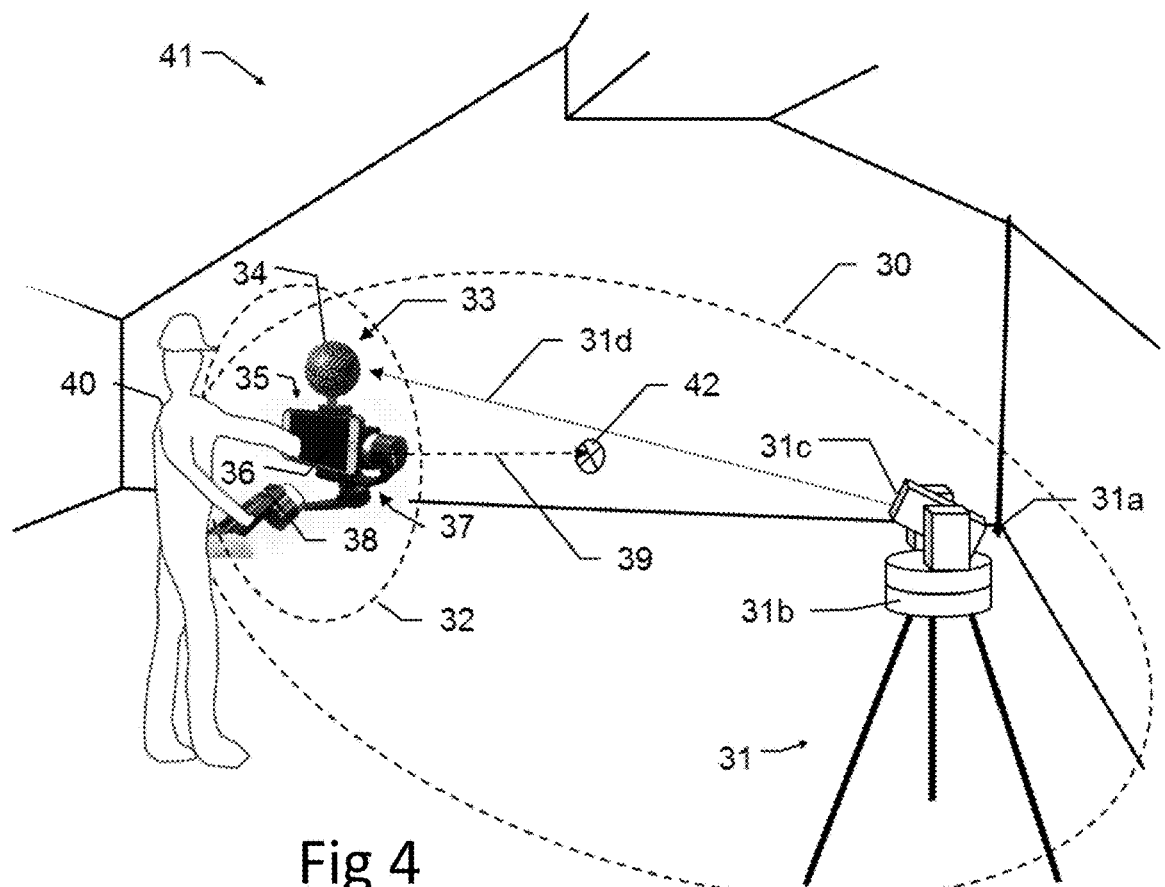
FIG. 4 shows an example of a surveying system having surveying functionality, which includes a surveying device and a handheld auxiliary measurement instrument.

FIG. 4 shows an example of a measurement system 30 with surveying functionality, which includes a surveying device 31 and a handheld auxiliary measurement instrument 32. In the example, the surveying device 31 includes a base 31b and a camera 31c (also referred to in the following as a second camera) pivotable around two axes relative to the base 31b by means of a structure 31a. The auxiliary measurement instrument 32 includes a carrier 37, which is handheld by a user 40 by means of a handle 38. The carrier 37 (shown exaggeratedly large in the image) is designed in such a way that the auxiliary measurement instrument 32 can be carried with one hand, so that the other hand of the user 40 is free to operate a computer terminal 35, for example a smart phone, held by the carrier 37. The computer terminal 35 includes a display screen 36 and a camera (not shown). An image of the measurement environment 41 is recordable and displayable on the display screen 36 by means of this terminal camera (first camera).

The carrier 37 includes a gimbal mount, so that the computer terminal 35 is location-stabilized. Therefore, for example, wobbling of the user hand or also shocks induced by the user 40 walking around in the room 41 can be effectively compensated for by means of the gimbal mount. The gimbal mount is preferably actively regulated, so that an alignment of the computer terminal 35 can be automatically set, whereby, for example, a target axis of the terminal 35 can be aligned automatically on an environmental point to be staked out or surveyed. For example, the user 40 taps a point of the construction site 41 shown therein in the measurement environment image on the display screen 35, which he wishes to survey, and the smart phone 35 or its measurement beam 39 (see below) is automatically aligned on the desired measurement point.

The computer terminal 35 is accordingly either introduced or introducible easily in predetermined and thus known defined position in the carrier 37 or the carrier 37 includes a joint, so that the position of the terminal 35 relative to the carrier 37 is changeable in a defined manner. The relative position is communicated, for example to the user of the system 30 in each case by input on the display screen 36 or automatically ascertained by means of a position encoder or by the system 30 or carrier 37.

Furthermore, a body 33, which is spherical in the example, is arranged on the carrier 37 as means for pose determination, and which is also location-stabilized by means of the gimbal mount in the example and is optionally also variable in position by means of the optional joint.

Alternatively to a spherical shape, the body 33 is designed as a regular polyhedron. Alternatively to the illustration, the body 33 can also be arranged at another exposed point of the carrier 37.

The body 33 includes an optical code 34 on its surface, wherein the code is distributed in such a way that code 34 is visible as much as possible from all viewing angles or relative positions of an external observer. The body 33 or the code 34 is designed in such a way that in an image of the auxiliary measurement instrument 32 or the body 34 recorded by the second camera 31c of the surveying device 31, the orientation and distance of the auxiliary measurement instrument 32 relative to the surveying device 31 is ascertainable one-to-one. The code 34 thus codes, on the one hand, the alignment or rotational position of the sphere 33. On the other hand, the distance to the body 33 from the surveying device 31 is ascertainable on the basis of the camera image of the surveying device 31, whereby the position of the instrument 32 relative to the surveying device 31 is determined together with measured target direction 31d of the camera 31 (pivot position). The target direction 31d is determined, for example, by means of one angle encoder each for a respective pivot axis. In the scope of the surveying functionality, the surveying device camera 31c thus records an image of the body 33 having code 34 and the image is evaluated by means of stored decoding information in such a way that both distance to the body 33 and also its orientation are ascertained, so that together with the measured camera position (targeting direction 31d) as a whole all six degrees of freedom of the sphere 33 and thus of the carrier 37 and the smart phone 35 are determined relative to the surveying device 31.

In other words, with the aid of the body 33, the location of the auxiliary measurement instrument 32 relative to the surveying device 31 is determined. The carrier 37 including body 33 thus represents a handheld auxiliary measurement prearrangement, which is used to accommodate a computer terminal 35, for example a smart phone or tablet, and is determinable in location by an external surveying device 31, so that overall a measurement system 30 can thus be composed. The surveying device 31 itself is in turn absolutely located, for example by a calibration by means of absolutely known markings in the measurement environment 41, so that finally the absolute location of the instrument 32 is determinable.

In one refinement, the computer terminal 35 includes an inertial measurement unit (IMU). The measurement data of the IMU are taken into consideration in this refinement in the determination of the location of the auxiliary measurement instrument. Above all, the data are used, during a measurement with movement of the instrument 32, to bridge times or spatial regions by means of dead reckoning in which a location determination by means of the body 33 is not possible, for example because the line of sight between first camera 31c and body 33 is interrupted by an object of the measurement environment 41. The location ascertained by means of dead reckoning is advantageously continuously transmitted here to the surveying device 31, which progressively performs pivoting/tracking of the camera 31c on the basis of the data, so that the pose determination on the basis of the body 33 can be resumed without delay as soon as the auxiliary instrument 32 has left the shaded environmental region and the line of sight is no longer interrupted.

As a further alternative or further addition, the means of the auxiliary measurement instrument 32 for determining or making determinable the pose in cooperation with the surveying device are designed in a way known per se as the IMU and gyroscope with determination of the yaw angle, as the IMU with tracking functionality for tracking a movement trajectory, as a visual, previously known marking/pattern on one of the parts of the auxiliary measurement instrument, for example barcode, or as light sources arranged in a defined manner (for example LED). A location determination can also optionally be carried out by means of an RIM camera of the surveying device 31 using SLAM algorithms (simultaneous localization and mapping).

The absolutely ascertainable pose, which is stabilized in the example by means of a gimbal mount, of the auxiliary measurement instrument 32 is used in the example to survey the position of at least one measurement environment point 42 absolutely. For this purpose, the computer terminal 35 includes a distance measuring functionality. In the example, the terminal 35 includes a laser distance meter, which emits a measurement beam 39 oriented on the point 42 and determines the position of the point 42 relative to the terminal 32 from reflected measurement radiation and known emission direction. The measurement system 30 then ascertains the absolute point position on the basis of the absolute position of the surveying device 30, the relative location of the auxiliary measurement instrument 32, and the relative position of the point 42.

As an option, the measurement system 30 is designed in such a way that a position scan is executable by means of the computer terminal 35, i.e., a large number of measurement environment points 42 is measurable in very rapid succession or a 3D point cloud can be generated. In a simple variant, this is carried out with fixed measurement beam 39, for example by manually pivoting the auxiliary measurement instrument 37 and/or by the user 40 running around in the room 41 during the measurement.

As a further option, the measured position of the point 42 is marked faithfully in position on the display screen 36 for the user 40 in a live image of the measurement environment 41. Further items of information or data links which relate to the environmental point 42 can also be displayed or offered. A live image is also optionally used so that the user 40 selects an environmental point 42 to be surveyed. For example, the display screen 36 is touch-sensitive and the user 40 taps the point in the image corresponding to the point 42, whereby surveying of the corresponding point in the room 41 is triggered in the scope of the surveying functionality.

Alternatively or additionally to surveying based on a measurement beam of the measurement environment 41 by the computer terminal 35, a photogrammetric position determination is carried out. For this purpose, the smart phone 35 includes, for example, a camera formed having double objective or at least two images are recorded from two different locations of the user 40.

Figure 5:
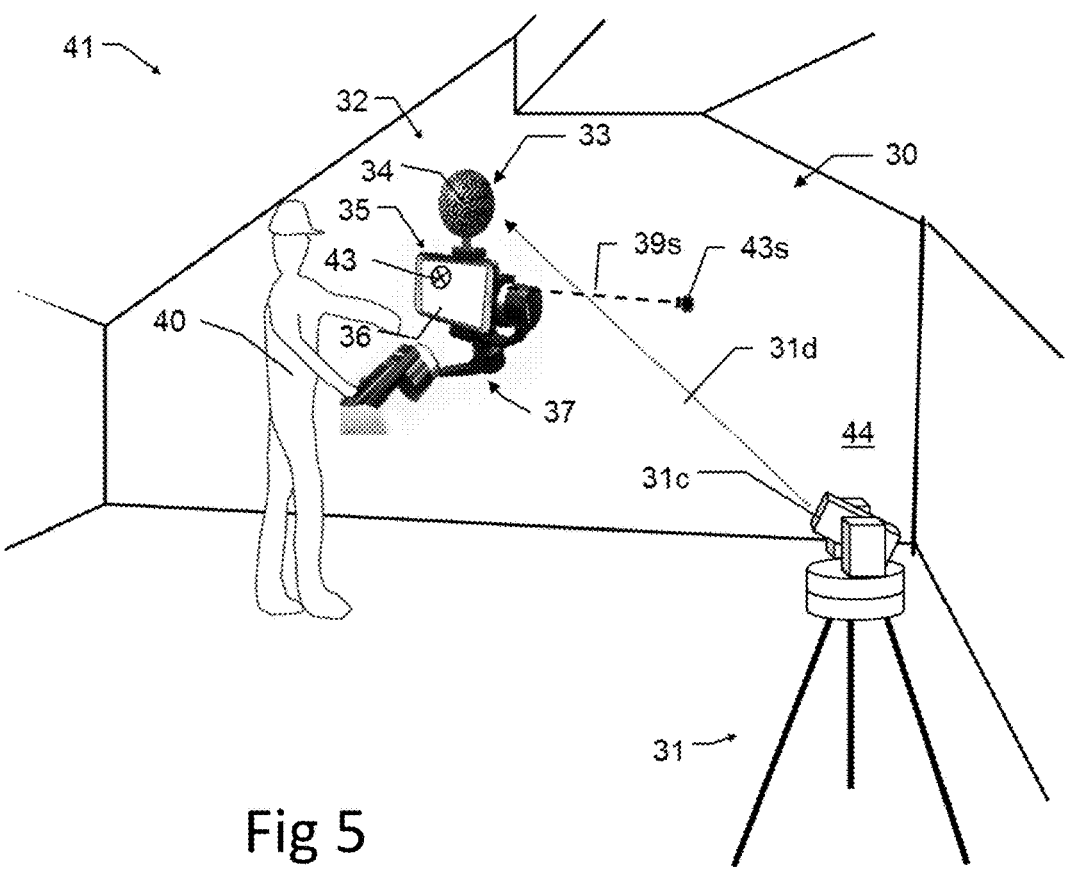
FIG. 5 shows a modification of the system from FIG. 4, FIG. 6a-e schematically show the method for surveying a target by means of a surveying device having target provision function, FIG. 7a,b show refinements of the target provision method.

FIG. 5 shows a modification or alternative or additional use of the measurement system 30 from FIG. 4. In contrast to the preceding example, the relative pose determined in the scope of the surveying functionality and the absolute location of the auxiliary measurement instrument 32 determined or determinable on the basis of the absolute locating of the surveying device 31 are used for the position-faithful display of at least one desired position (stake-out point). This point to be staked out is stored in a memory of the system, for example as part of a building construction plan.

In the example, the absolute location of the computer terminal 35 inserted in the carrier 37 is determined and the desired position is retrieved from the memory. The computer terminal 35 furthermore includes a marker (not shown), in the example a laser pointer, which can emit a visible laser beam 39s oriented in a defined manner. Based on the known absolute position and alignment of the computer terminal 35 and the absolute desired position, the laser beam 39s is then emitted targeted in a direction by automatic setting of the emission direction, for example by means of an abovementioned active gimbal mount (gimbal) in such a way that it marks the desired position faithfully positioned in the measurement environment—in the example on the room wall 44—as a visible laser spot 43s.

Alternatively or additionally, the emission direction of the marker is fixed and the user receives an instruction on the display screen 36, on the basis of which he changes the location of the auxiliary measurement instrument 32 until the marker targets the point 43s. Of course, such user guidance is also possible for the case of a marker with variable marking direction, for example in order to instruct the user 40, in the case of very unfavorable location of the instrument 32, to pivot it at least until the point 43s reaches the (maximum) marking region of the marker. As a further option, a laser line or laser surface is generated to mark one or more desired positions by means of the laser pointer. Possible user-related shaking of the auxiliary measurement instrument 37 can be compensated for by the gimbal mount, so that no shaking of the marking point 43s occurs.

I.e., the measurement system 30 or the measurement method is advantageously used, for example, to mark a desired position exactly, for example on a construction site where a construction activity is to take place, for example a hole is to be drilled according to the construction plan. Then, for example, by a continuous determination of the auxiliary measurement instrument location and corresponding tracking of the marking beam 39s, the user can walk to the marked point 43s and either immediately execute the required construction activity using the free hand or, for example, apply a permanent marking on the surface 44 using a pencil. The carrier 37 optionally includes a locking mechanism, with the aid of which the carrier 37 is fixable without tools in the room 41. For example, a stand is provided, so that the user 40 can place the instrument 32 on the ground, roughly aligned on the wall 44, so that the laser pointer marks the point 43s. Therefore, without still having to hold the instrument 32, the user 40 can either more easily permanently mark the point 43s or execute the construction activity. A further example of such a locking mechanism is a clamp, using which the carrier 37 is fixable, for example on a wall so it is releasable again. One advantage of the use of a proposed auxiliary measurement instrument 32 is that it is thus possible to work close to the wall 44 and a large measurement environment 41 can be completely surveyed or staked out easily, without having to reposition the surveying device 31 (i.e., without complex stationing change). Therefore, measurement points 43s may thus also be reached from a stationing of the surveying device 31, which are withdrawn from the direct access from this stationing, for example due to vision obstacles in the direct line of sight.

Alternatively or additionally to a light-based, transitory marking, the auxiliary measurement instrument 32 includes a marker, using which physical marking of desired positions is enabled. Then, for example, a color marking 43s is applied in an oriented manner on the wall 44 with the aid of a printer or a spray device.

In FIG. 5, a position-faithful display of the stake-out point in a live image of the construction site 41 recorded by the smart phone 35 is symbolized as a further option. Knowing the pose of the smart phone 35, a graphic marking 43 is overlaid on the live image (video image) recorded by the smart phone camera, so that the user 40 can see the wall 44 and simultaneously the desired position faithfully positioned on the display screen 36, i.e., an augmented reality view is present. As a further option (not shown), in addition to solely the position marking, further items of information relating to the desired position are displayed on the display screen, for example the type of the tool to be used at the point or a virtual view of the construction site as it is supposed to appear after execution of the construction activity at the desired point.

Figure 6A:
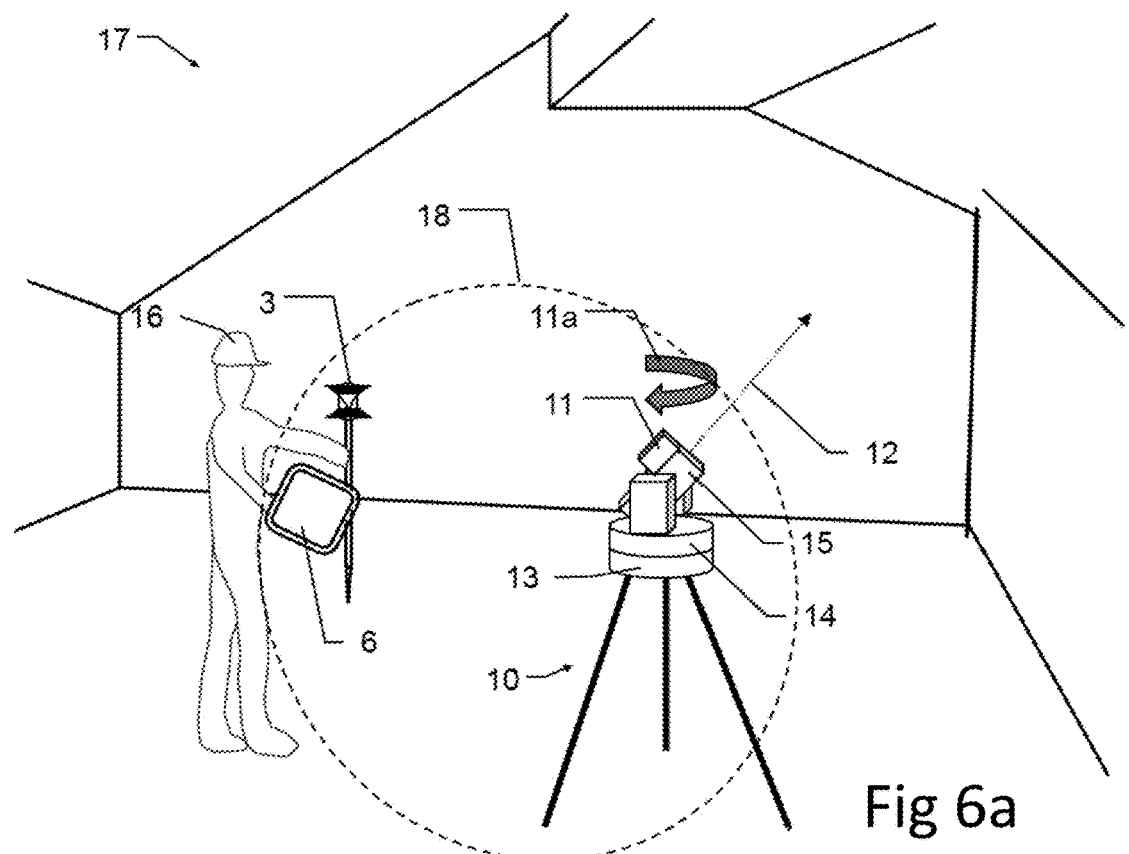

FIGS. 6a-e solely schematically show the method for surveying a target by means of a surveying device having target provision function. A measurement environment 17, for example a building room as shown, in which a surveying device 10 having direction and distance measuring functionality, for example a total station, is set up by the user 16 at a location, is shown in FIG. 6a. The user 16 himself marks in the room a position to be surveyed in a way known per se using a prism pole or surveying pole having a target 3, for example a retroreflective prism, and holds a display screen device 6 in the hand, which is wirelessly connected to the surveying device 10, so that data can be transferred between the two devices 6, 10. Moreover, the surveying device 10 and/or the mobile device 6 includes a controller having evaluation functionality. The user can preferably control the surveying device 10 by means of the controller and input on the display screen 6. Alternatively to the representation with display screen 6 and surveying device 10 as separate units, the display screen 6 can also be a fixed or removable part of the surveying device 10. The surveying device 10 and the display screen 6 form a surveying system 18.

The surveying device 10 includes a base 13, relative to which a structure 14 is arranged so that it is rotatable by a motor around two axes. The structure 14 defines a target axis 12, which is thus also pivotable around two axes. In the example, the structure 14 includes a beam source and a measurement radiation detector, for example a distance meter 15 in the form of a laser distance meter, so that in the scope of a single-point determination functionality, from knowledge of the distance thus measured to a target lying in the target axis 12 and the direction to the target or alignment of the target axis 12, for example measured by means of an angle encoder, the position of the target relative to the surveying device 10 and on the basis of its known location the position in the room can be determined. Furthermore, the surveying device 10 includes a camera 11, which is aligned in the direction of the target axis 12. Notwithstanding the illustration, this camera 11 can be designed, for example, as an on-axis camera.

The surveying system 18 includes a target provision function or target acquisition function, in the scope of which in a first step a large-scale image of the measurement environment 17 is recorded, for example a full dome image. In the example, this is carried out by pivoting the camera 11 (symbolized by arrow 11a) by rotating the structure 14 with continuous image recording. Alternatively, the recording of the overview image is carried out by means of a second camera, which the surveying device 10 includes. This further camera can have such a broad field of view, for example, that the measurement environment 17 can be imaged in a motionless manner thereby, for example over a horizontal angle of 200° or more. Such a camera is, for example, a so-called overview camera, which is additionally arranged on the structure 14. For example, a camera of the display screen device 6 can also be used as the second camera, in that the user 16 carries out a recording of the room 17 from or close to the location of the surveying device 10, so that the image essentially corresponds to the view of the surveying device.

Figure 6B:
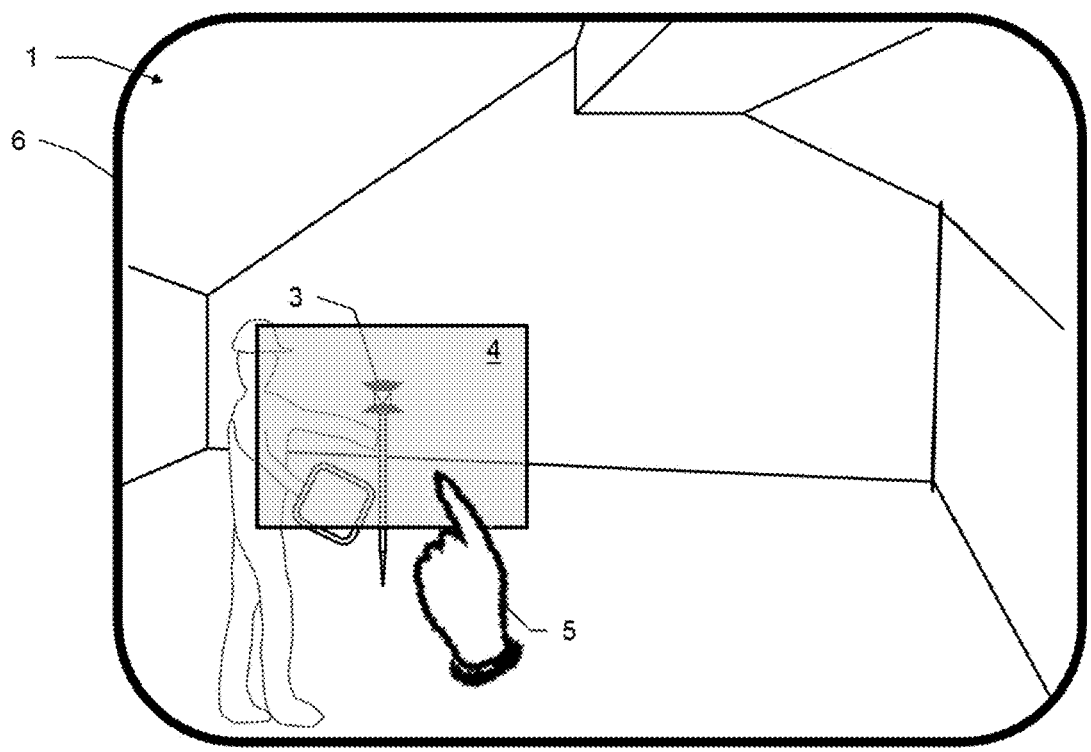

FIG. 6b shows how the recorded overview image 1 is subsequently displayed on the display screen 6, for example after it has been transferred via Bluetooth or Wi-Fi from the surveying device to the mobile display screen. The user now selects on the basis of the overview image 1, for example in the case of a touchscreen by a manual touch as symbolized by the hand 5, a target region 4 in which the target 3 to be surveyed is located. The selection 5 is carried out, for example in that the user defines a rectangular frame of specific size in the image 1 or is automatically assisted in that he taps on a point in the image (or on the display screen) and a predefined frame is automatically defined around the contact point as the target region. As a further option, the predefined size of the target region 4 can be changed by multiple taps, for example in three steps. Alternatively, the size of the target region 4 is automatically set as a function of existing measurement data, for example in that a (rough) distance to the target region 4 is ascertained, for example by image evaluation. For example, the more remote the targeted region 4 is in the space from the surveying device, the smaller the target region 4 can then be automatically set, so that an at least approximately equal measurement environment area is always selected as the target region 4 independently of the distance. The width of the field of view of the camera 11 is also optionally taken into consideration in the target region size definition. In any case, a manual definition of a target region 4 is carried out, which is optionally automatically assisted by the surveying system 18, so that a rough selection or determination of the direction with respect to the target 3 to be surveyed takes place.

Figure 6C:
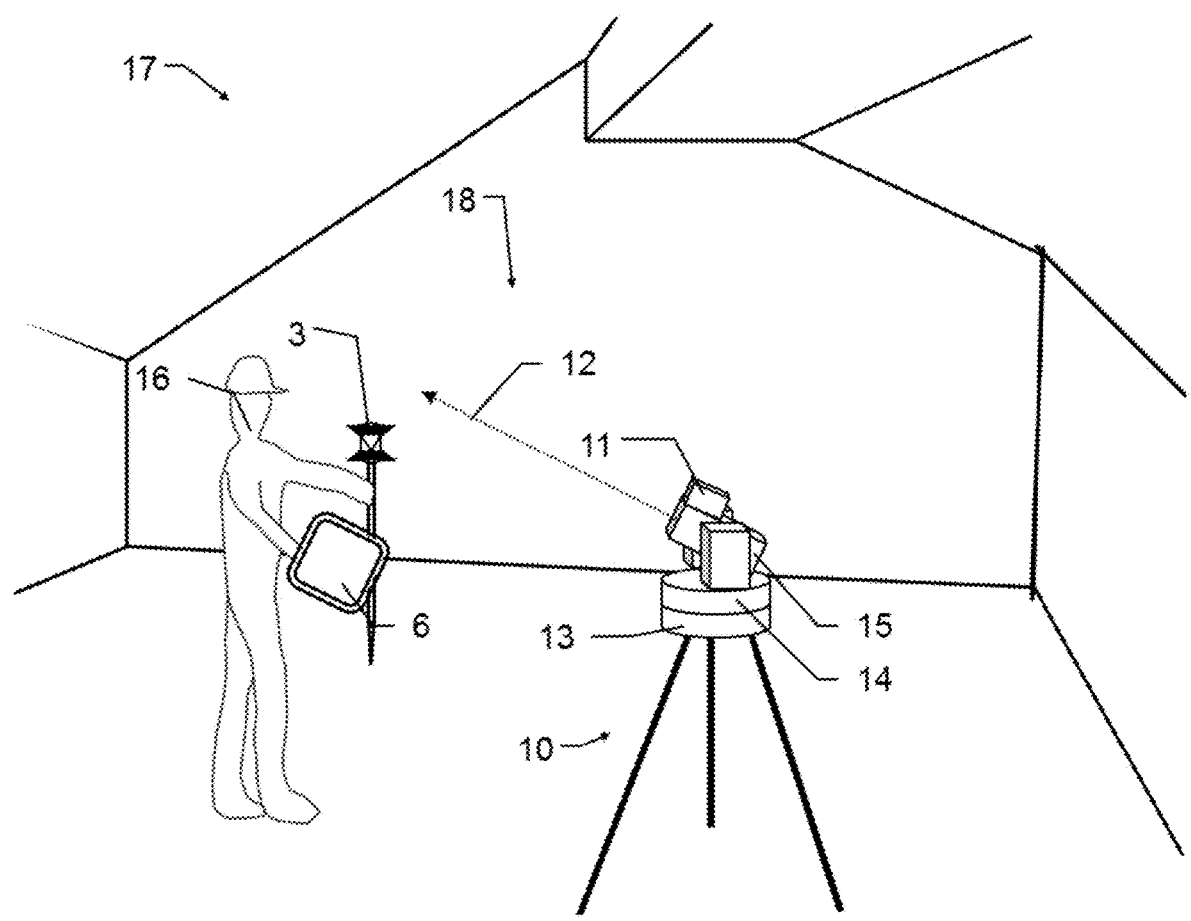

FIG. 6c shows how a first, rough alignment of the surveying device 10 on the target 3 is carried out on the basis of the manually defined target region registered by the controller. The controller ensures on the basis of the target region selection that the structure 14 is pivoted in such a way that the target axis 12 comes to rest in the direction toward the target region. It is ensured by the pivoting that the target is located in the field of view of the camera 11 aligned in the direction of the target axis 12. The surveying device 10 is thus aligned by the previous target region selection in such a way that a second image can be recorded by the camera 11, which represents a detail containing the target 3 from the overview image or the measurement environment 17.

Figure 6D:
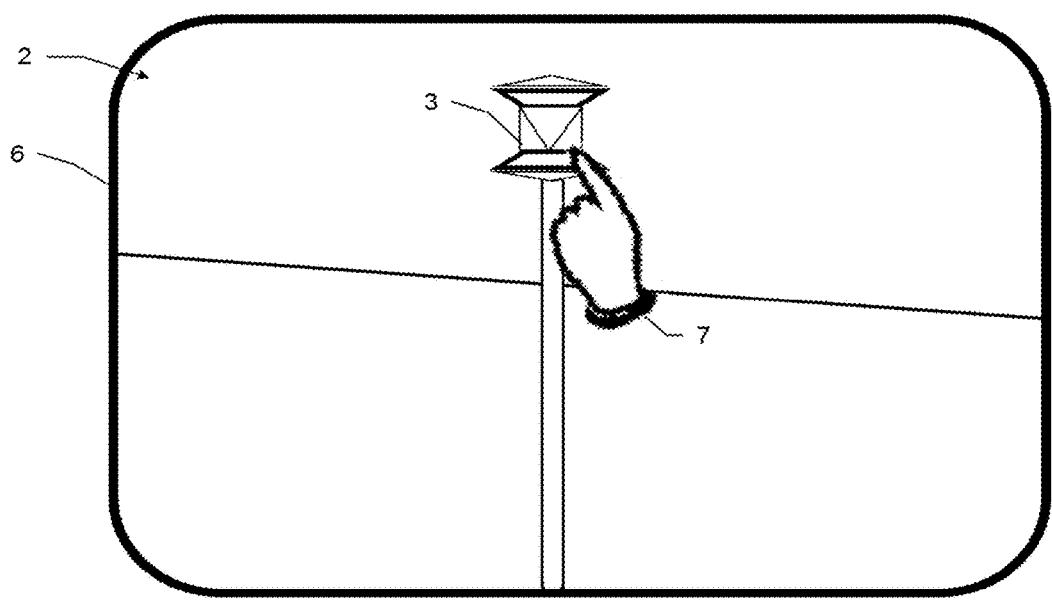

FIG. 6d illustrates an example of such an image 2 of the camera 11. In the image 2, the target 3 is shown comparatively large. It is thus made possible that the user can precisely mark the target 3 manually, for example by touching the display screen 6 (represented by the hand 7), whereby the controller is "informed" about the accurate direction to the target 3.

Figure 6E:
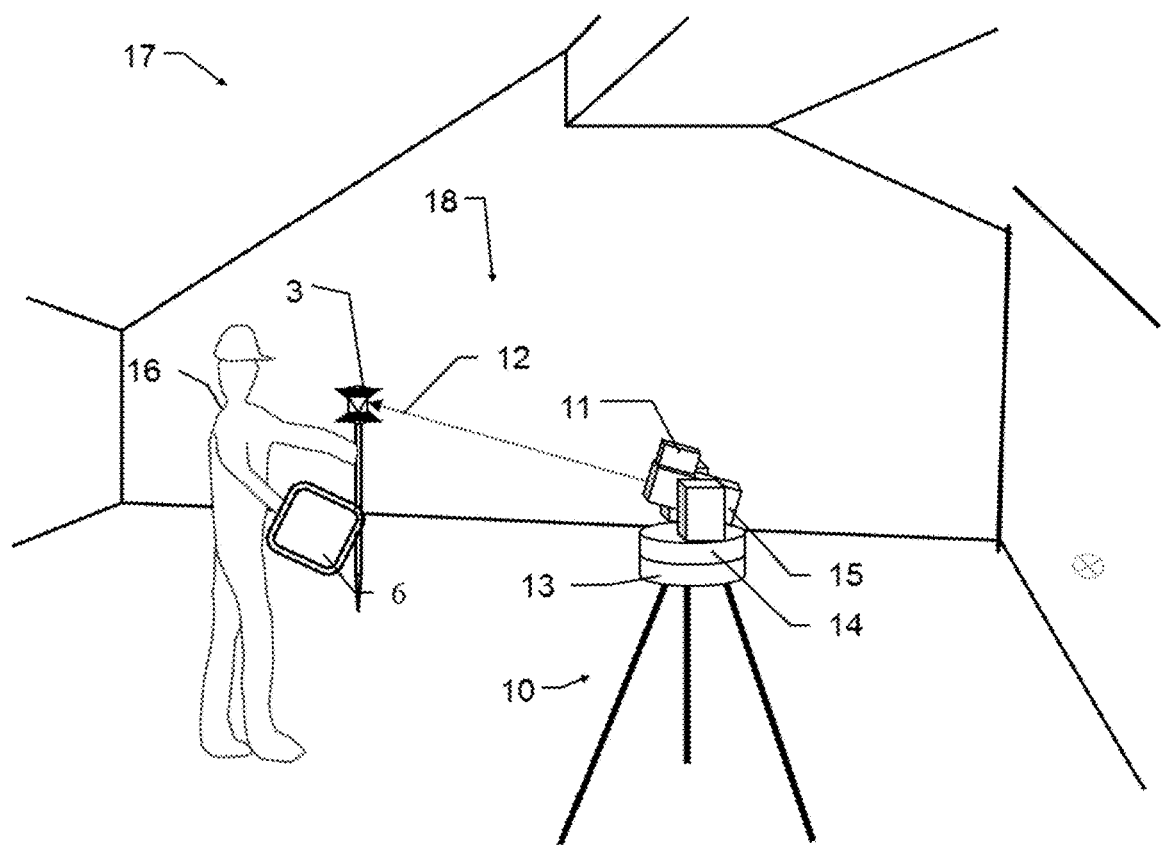

As shown in FIG. 6e, the target axis 12 is then pivoted by the controller on the basis of the previously manually made target selection in such a way that this axis is aligned on the target 3. The target 3 can thus be coordinatively surveyed by means of the direction and distance measuring functionality.

By way of the proposed method, the surveying device 10 is thus aligned on the target 3 in two steps by the user 16, in that he first defines an approximate direction to the target 3 in an overview image 1 by means of the target region 4, which is refined by a second manual selection on the basis of the further image recorded in this rough direction in such a way that the target 3 can be targeted and thus can be surveyed.

Figure 7A:
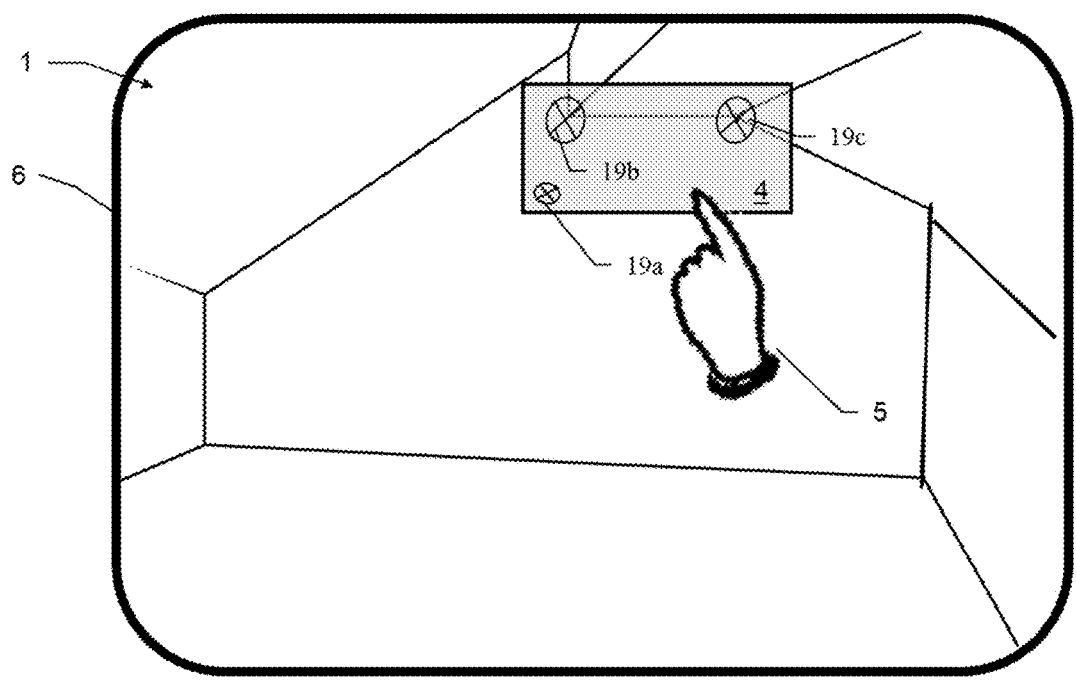
Figure 7B:
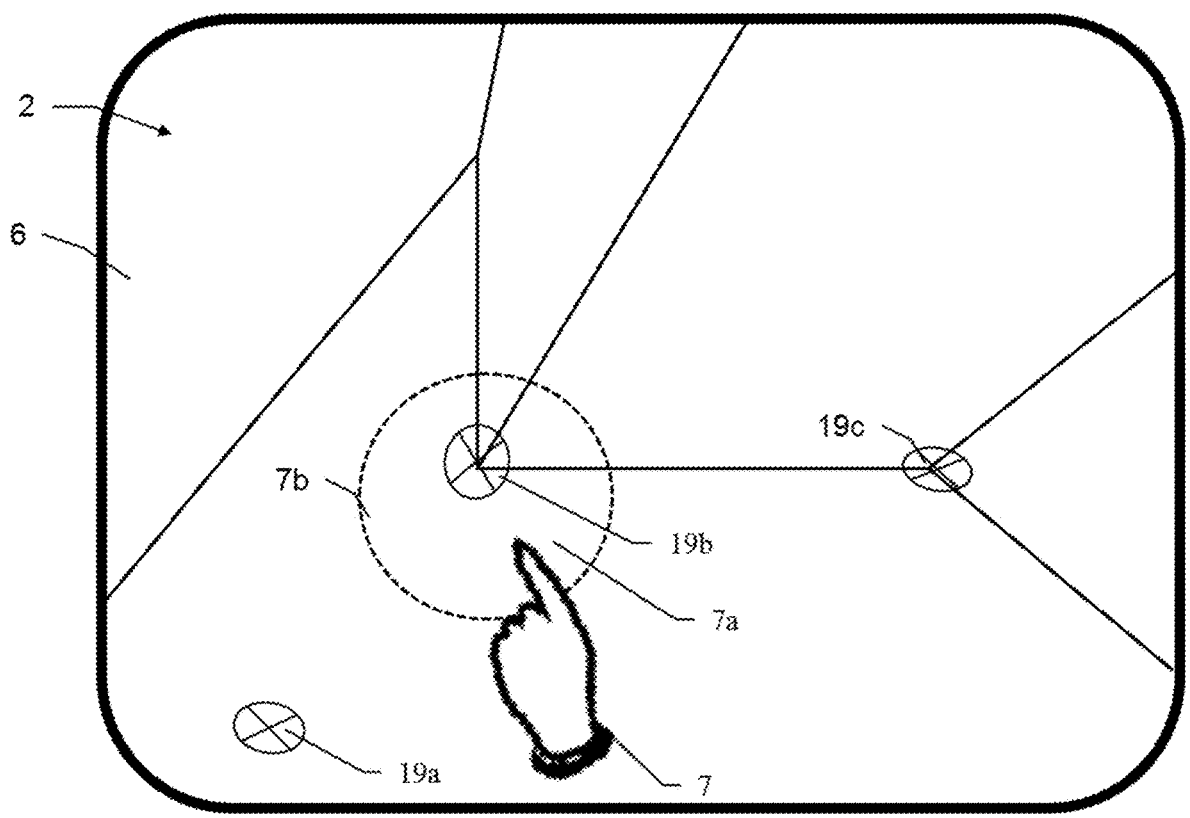

FIGS. 7a and 7b show refinements of the target provision method. In FIG. 7a, which indicates the overview image 1 displayed on the display 6 similarly to FIG. 6b, it is shown that known and ascertained potential targets 19a, 19b, and 19c are indicated by means of graphic markings. In the example, the target 19a is a target stored in an electronic memory, which is known, for example, from a prior survey in the measurement environment or was ascertained on the basis of a construction plan having desired positions, to which the image 2 has been compared. In contrast, the potential targets 19b and 19c are those which were automatically recognized as distinctive environmental points by means of image processing in the overview image 1. For example, an edge extraction is carried out in the image 1, on the basis of which corner points of walls 19b, 19c have been ascertained as shown and proposed to the user as targets.

In the example, an automatic proposal of a target region 4 is additionally carried out as a function of the potential targets 19a-19c. For example, a target region 4 is defined by the controller so that it comprises the three targets 19a-c located close to one another. The user can then simply select this target region 4 as the target region 4 to be used by touching the display screen 6 or possibly manually change the size of the target region 4 or mark or select another target region 4.

In FIG. 7b, which is similar to FIG. 6d, the target region image 2 recorded on the basis of the target region 4 of FIG. 7a is shown. In this close-up of a detail of the measurement environment, the potential targets 19a-19c are shown very comprehensibly for the user. He can thus manually mark and thus select a target ultimately to be surveyed without difficulties. In the example, the user selects the target 19b for surveying, wherein the selection 7 is automatically assisted in that by touching around the contact point 7a within a zone 7b, the target 19b is automatically established as the target to be selected. In other words, the system automatically ascertains the target in the surroundings of the contact point 7a, so that the user does not have to hit precisely on the targeted target 19b on the display screen 6. The zone 7b can be fixedly defined or possibly variable and—within certain limits—can be expanded until a target is located therein.

Alternatively to the display with an already ascertained target 19b, which is only still to be selected, optionally, for example, by the image processing mentioned with respect to FIG. 7a, a target is first ascertained, for example by edge extraction, within the zone 7b. As a further option, the user not only marks a target 19b in the image 2, but rather, for example, also the two other targets 19a and 19c, so that the surveying device surveys all three targets 19a-19c.

Figure 8:
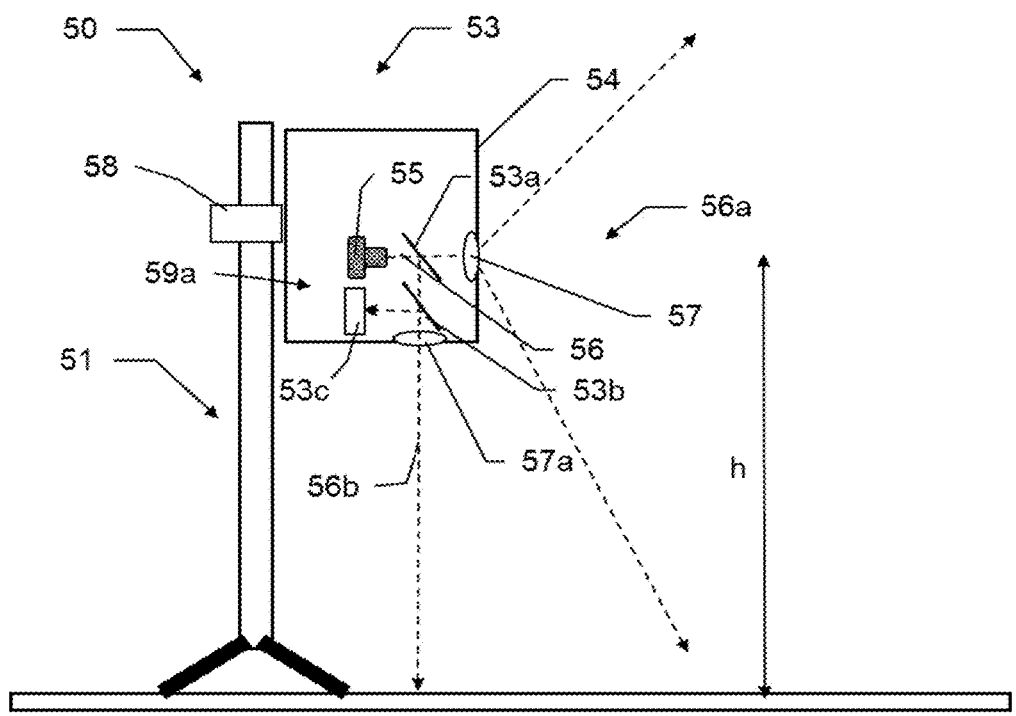
FIG. 8 shows a first embodiment of a construction laser system.

FIG. 8 shows a first embodiment of a construction laser system 50. The construction laser system 50 includes a self-leveling laser module having a construction laser 53 having a laser source, for example the laser diode 55, integrated in a housing 54. The radiation 56 of the laser source is expanded in the example by means of an optical unit 57 of the laser module and thus emitted as the laser fan 56a in the room where it is used, for example as a linear position reference for construction activities in the inside or outside region. The self-leveling is achieved, for example, by means of a gimbal mount or a ball joint.

The construction laser system 50 designed in the example as a line laser system 50 furthermore includes a holder 51, which is pole-shaped in the example and which is placed on a reference floor 52, for example a floor of a story. A line laser 53 is fixed so that it is releasable again on this holder 51 by means of a locking mechanism 58. The holder 51 is thus used to fix the line laser 53 flexibly at a height h desired for the position reference above the floor by means of the fixing mechanism 58. In systems of the prior art, the height h disadvantageously has to be manually measured.

In contrast, the present line laser includes an integrated opto-electronic distance meter 59*a*, using which the respective existing height h is automatically measured. Thus, for example in a way known per se, for example based on triangulation, phase evaluation, and/or runtime evaluation, the distance of the housing 54 to the floor 52 is measured or the distance of the laser light 56*b* forming the position reference to the floor 52 is measured by means of measurement radiation. A solely manual measurement of the height h of the position reference, as is necessary in devices of the prior art, is thus superfluous.

In the example, the laser source 55 is advantageously used in a dual manner for this purpose, i.e., the laser radiation 56 is used both to provide the reference line 56*a* and also the measurement radiation 56*b* for the height measurement. For this purpose, the radiation originating from the diode 55 is divided by a beam splitter 53*a*, so that a part 56*b* of the radiation is guided in the direction of a second optical unit 57*a* on the lower side of the housing 54 or in the direction of the floor 52. Radiation reflected from the floor is guided by means of the second optical unit 57*a* and an optical deflection element 53*b* to a detector 53*c* of the distance meter 59*a*. The desired height h is then ascertained from the detector signal. Alternatively, the line laser 53 includes an additional radiation source for the height measurement.

The automated measurement of the height h by means of a height measurement unit like that of the illustrated distance meter 59*a* is either manually triggered—for example by pressing a trigger button attached to the housing 54 or via remote control—or it is automatically carried out progressively, for example at specific measurement intervals. As a further alternative, an automatic height measurement is carried out, for example after completed locking, which is established by means of corresponding sensors, and/or after a specific time, in which no movement of the housing 54 has been detected (for example by means of acceleration sensors).

FIG. 9 shows a second example of a line laser system. In the figure, for illustration purposes the line laser 53 and the holder 51 are shown enlarged in comparison to FIG. 8, the holder 51 is only partially shown, and the reference floor is omitted. For further graphic simplification, moreover except for the emitting optical unit 57, further components of the line laser 53 and the housing 54 are not shown.

In the example, the height h is automatically determined in that the holder 51 includes an optically readable position code 51*a* along the vertical axis h, for example a bright-dark coding or a color coding. The position code 51*a* absolutely codes the position along the vertical axis h. Using an optoelectronic read head 59 of a position encoder 60, which is integrated in the example in the locking mechanism 58, the respective present height h can thus be measured and displayed, for example as shown on a display 59*d* attached to the housing 54. An alternative to the illustrated optical position encoder 60 is a capacitive or magnetic position encoder.

As a further alternative, in contrast to the illustration, the holder 51 does not include the passive part of the position encoder 60, but rather the line laser 53. For example, a target is integrated in the locking mechanism 58, which is detectable by the holder 51 designed for this purpose along the height h and thus indicates the position of the line laser 53 relative to the holder 51. The evaluation of the measurement signal generated by the holder can also take place completely in the holder and the height value can be displayed, for example on a display of the holder 51.

In the example according to FIG. 9, the position encoder 60 or the coding 51*a* is moreover designed in such a way that in addition to the height h, the horizontal alignment or the alignment relative to the holder 51 of the housing 54 (or of the line laser 53) can be measured. I.e., the coding 51*a* not only codes the position along the vertical axis h, but also perpendicularly thereto, so that the rotation R around the vertical axis h can be read out by means of the read head 59 and displayed, for example on a display 59*d*. Such optical surface or 2D codings are known in principle from the prior art.

Alternatively to the integration of the alignment measurement in the distance and/or position meter, i.e., of a 2D encoder as shown, the system 50 includes a separate distance and/or position meter and a separate alignment meter.

FIG. 10 shows a refinement of the preceding embodiments. In the example, the line laser system 50 includes a drive 61 in addition to a height meter, for example the position encoder 60. The height h of the line laser 53 is adjustable in an automated manner by means of the drive 61. In the example, the drive 61 is designed as a gearwheel 61*a*, which is driven by a motor 61*b* in order to be able to move the housing 54 downward or upward along a guide rail 62 of the holder 51. An alternative to this exemplary drive 61 is, for example a magnetic linear drive, which is integrated in the holder 51 and pulls the locking mechanism 58 upward or permits it to drop downward in a defined manner. I.e., in this alternative, in contrast to the illustrated drive, the active element of the drive 61 is integrated in the holder and the line laser 53 is passive. Depending on the specific design of the system 50, a targeted distribution of the drive components can offer advantages, for example in the case of an active holder 51, a battery of the drive can be placed in the holder base, the weight of which increases the stability, on the one hand, and avoids additional weight in the line laser 53, on the other hand.

Furthermore, the system 50 includes a controller 62 having corresponding control software, which regulates the drive 61 in such a way that a desired height h is automatically set on the basis of the height measured progressively using the height meter 59. I.e., the housing 54 is moved by means of the drive 61 in a manner controlled by the controller 62 until the desired height h is reached, then the position is automatically fixed by the controller 62 by means of the locking mechanism 58.

In the example, the system 50 furthermore includes a remote-control receiver or more generally a communication module 63, which is integrated in the housing 54 in the example. This receiver 63 is used, on the one hand, for the remote control operation of the drive 61 and/or for communicating a desired height h to the controller 62 from a remotely positioned user, so that the controller 62 then automatically sets the height h as described.

As a further option (not shown), holder 51 and line laser 53 are equipped with a two-axis drive, so that in addition to the height h, the horizontal alignment of the laser can also be changed in an automated manner—and optionally also automatically by means of the controller 62. In such embodiments, not only a desired height, but also a desired orientation may thus be set in an automated manner or automatically.

FIG. 11*a* shows a first embodiment of a surveying system 77 having an auxiliary measurement instrument 70 and a surveying device 71 having an active gimbal mount 76. The surveying device 71 is designed, for example, as a total station having a structure 71*a* that is pivotable around a base 71*b* in two axes and has a laser source for emitting a measurement beam M, so that, for example, based on a runtime measurement of the measurement beam M, a distance to a reflective target 74, which provides a reference point 74*r*, can be measured and on the basis of the measured alignment of the measurement beam M, the position or the coordinates of the target 74 or more precisely of the reference point 74*r* are measurable.

The auxiliary measurement instrument 70 providing the target 74 includes a handheld pole 72 in the example, which is placed at a terrain point 78 to be surveyed on the floor 52 by the user 40. In the example, the terrain point 78 is located in a hole, where it can only be contacted with difficulty and thus surveyed using conventional prism poles.

Using the auxiliary measurement instrument 70, it is now not necessary to contact the terrain point 78 using the pole 72 and to align the pole exactly vertically. On the pole 72 equipped for this purpose with an angled end, an assembly 73 is attached, which is thus arranged with an offset to the pole 72 because of the angle. The attachment to the pole 72 is carried out by means of a gimbal mount 76 having two axes of rotation a1 and a2. The gimbal mount 76 is or, more precisely the gimbal axes a1 and a2 are, actively driven by means of motorization (not shown separately), so that the assembly 73—or more precisely its vertical axis A—can be aligned exactly vertically itself or automatically—without separate user-side action—by regulating the axes a1 and a2.

The assembly 73 includes, on the one hand, the target 74 at the upper end, which is thus automatically aligned vertically due to the actively regulated gimbal arrangement 76.

On the other hand, the assembly 73 includes a targeting unit 75 designed as a laser in the example at the lower end. The targeting unit 75 is used for targeting the terrain point 78 to be surveyed and has for this purpose a target axis A, which coincides in the example with the vertical axis A. In the example, a laser beam L is emitted by the laser along the target axis A. On the one hand, the terrain point 78 is marked so it is optically visible to the user 40 by means of the laser beam L, so that the user 40 can thus verify the alignment of the target axis A, can thus recognize whether he actually targets the point 78.

On the other hand, in the example the laser is part of a laser distance meter, on the basis of which the distance from the target 74 or from the reference point 74*r* to the terrain point 78 is measured. Therefore, due to the vertical alignment of the axes A provided by the gimbal mount 76, the coordinates of the terrain point 78 are uniquely determinable from the distance between reference point 74*r* and terrain point 78 and the coordinates of the reference point 74*r* measured by means of the surveying device 71 on the basis of the target 74.

Alternatively to the illustrated arrangement, the target 74 is arranged in such a way that the reference point 74*r* is located at the intersection point of the two gimbal axes a1 and a2. As a further alternative to the illustration, the arrangement of target 74 and targeting unit 75 is exchanged, so that thus the targeting unit targets vertically upward, whereby points of a ceiling can be surveyed, for example. The targeting unit 75 or also the entire assembly 73 can also be arranged in such a way that the target axis of targeting unit 75 or the targeting axis is horizontal. Alternatively to a laser distance meter operating according to the phase principle, for example, the electronic distance meter of the targeting unit can include, for example, a line array, in order to determine the distance to the terrain point 78 according to the triangulation principle, a surface array similar to a time-of-flight (ToF) camera, or can measure the distance by means of waveform digitizing (WFD). The mount 76 can include one or more inclination sensors. Inclination sensors may be approached and leveled with high accuracy and with small measurement range by means of the presented active regulation of the mount 76.

By means of an active mount 76, for example, a targeted alignment can be carried out not only in the vertical and/or horizontal, for example for the automatic targeting of a terrain point 78, automatically and/or remote controlled. The active gimbal mount 76 thus advantageously makes it possible that not only can a vertical or horizontal alignment of the target 74 and/or the target axis A be automatically achievable, but due to the motorization, the assembly 73 can also be set automatically or in an automated manner to any arbitrary other angle. The gimbal mount 76 thus enables not only an automatic, high accuracy, and rapid vertical or horizontal alignment of the assembly 73, but rather if needed also a defined other arrangement of the assembly 73, without the user 40 having to fix or align the pole 72 in a specific position or mounting. Angles can thus be approached deliberately and marked by means of the pointer laser beam L, for example to indicate alignment specifications.

Moreover, movements of the auxiliary measurement instrument 70 or the assembly 73 may be adaptively damped by means of the active mount 76, so that, for example, even with unsteady positioning of the instrument 70, exact measurements are enabled. For example, tracking of the target 74 by the surveying device 71 when the instrument 70 is being carried around by the user 40 may also be substantially simplified by the regulation of the damping, since the shaking due to the user 40 can be optimally balanced out by the damping matched to the shaking.

For example, a remote control can take place from the surveying device 71, so that from the location there, one or more surveying points 78 can be approached automatically or by a user there, also surveying points which, contrary to the illustration in FIG. 11*a*, are not located in the vertical or horizontal viewed from the standpoint of the auxiliary measurement instrument 70. Moreover, for example, stored points to be staked out or layout points can thus be retrieved from an electronic memory and as soon as the instrument 70 is located in suitable proximity to the point or points, these can be marked/displayed automatically on the floor or on a wall, for example by means of laser beam L, in that the alignment of the laser beam L is set accordingly by means of the active gimbal mount 76.

The surveying system 77 can also include means using which the orientation of the gimbal mount 76 relative to the surveying device 71 is determinable, for example an optical sphere code at the target 74 or other optical markings on the assembly 73, which is or are acquired and read out by means of a camera of the surveying device 71. Alternatively or additionally to such passive means which can be read out or evaluated by the surveying device 71, the measurement instrument includes active means for orientation determination, for example an IMU and/or inclination sensors. Therefore, in addition to the position determination (3-DoF), a 6-DoF survey of the auxiliary measurement instrument 70 by the surveying device 71 is enabled, which can be used, for example, in order to utilize the auxiliary measurement instrument 70 as a 3D distance meter, in particular for short measurement distances to a terrain point 78.

As a further option (not shown), the assembly 73 having active gimbal 76 includes a target tracking unit, using which a moving device or vehicle located in the vicinity can be tracked, for example in a camera-based manner or by means of a position-sensitive detector. Such target tracking units are known in industrial laser trackers, for example under the keyword "ATR" (automated target recognition) and are described in greater detail with reference to the sixth aspect, for example for FIG. 14.

FIG. 11b shows an alternative embodiment of an auxiliary measurement instrument 70. In this example, the assembly 73 having target 74 and targeting unit 75 is attached by means of an active gimbal mount 76 having the two gimbal axes a1 and a2 to a tripod 72'. The assembly 73 can be positioned as shown at a terrain point 78 by means of the tripod 72', in order to survey or stake out this point 78 as described above.

FIG. 11c shows a part of the auxiliary measurement instrument 70 of a further embodiment, and specifically the gimbal mount 76 having the two axes a1 and a2 and also having an assembly 73' suspended thereby is shown. In the example, in addition to the targeting unit 75, the assembly 73' includes a further targeting unit 75a, the target axis of which is perpendicular to the target axis of the first targeting unit 75 and is thus aligned horizontally in the example. In the example, the second targeting unit 75a also includes a laser, so that points in the horizontal or at an angle perpendicular to the axis A can be surveyed or marked by means of the second laser beam L'. For example, the second laser light L' can also be emitted in a fan shape, so that, for example, vertical lines can be recorded or marked on a wall, from a defined standpoint, which is maintained and/or surveyed by means of the first laser beam L. Vertical and horizontal targeting and distance measuring can thus advantageously be combined in order to thus mark vertical lines precisely.

Figure 12:
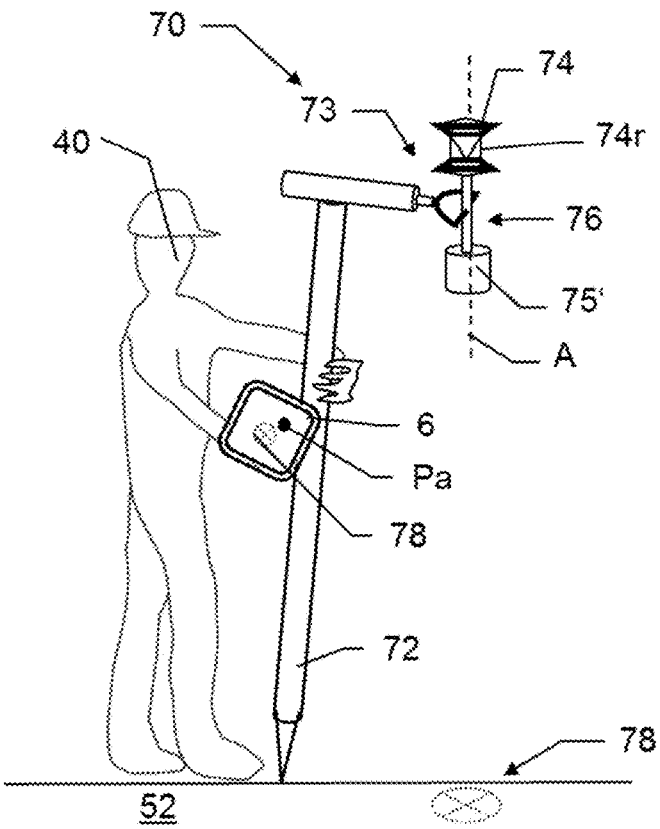
FIG. 12 shows an alternative embodiment of an auxiliary measurement instrument.

FIG. 12 shows an alternative embodiment of an auxiliary measurement instrument 70. In contrast to the embodiment according to FIG. 11, the gimbal-mounted assembly 73 includes a targeting unit 75', which includes a camera aligned along the target axis A. The camera thus records an image of the part of the floor 52 located vertically below it. This image is transferred, for example wirelessly, to an external user display, for example a tablet 6 as shown or also augmented reality glasses or an AR helmet. In the image, which shows the terrain point 78, the (virtual) intersection point Pa of the targeting axis A is shown with the floor 52 as an overlaid graphic. By means of this representation on the display 6, the user 40 can now change the position and/or mounting of the auxiliary measurement instrument 70 in such a way that the displayed intersection point Pa overlaps with the representation of the terrain point 78, the targeting axis A is thus aligned on the terrain point 78. The distance from the position reference point 74r to the terrain point 78 is, as described above, either measured in a camera-based manner using the targeting camera or by means of an additional electronic distance meter.

Alternatively to a user-side change of the position and mounting of the instrument 70, the assembly 73 is automatically aligned by means of the drive of the gimbal mount 76 in such a way that the intersection point Pa corresponds to the floor point 78, i.e., the targeting axis A is then not necessarily vertically aligned, rather the alignment angles are measured after completed alignment.

Figures 13A, 13B, 13C:
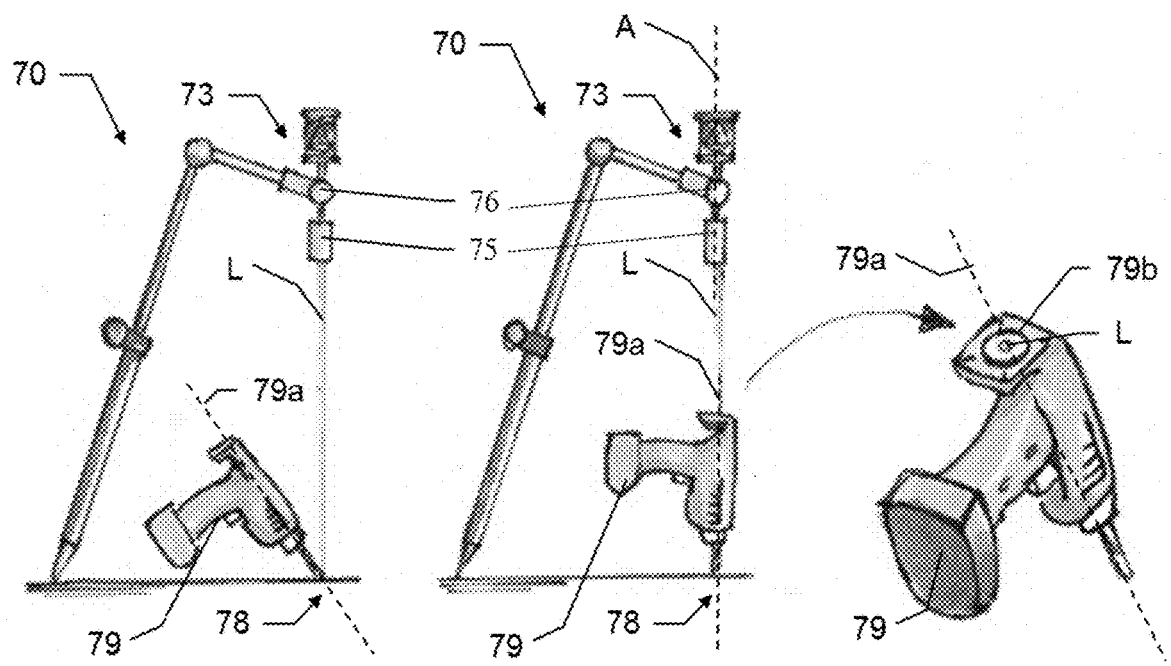
FIG. 13a-c show an example of a method for checking alignment using an auxiliary measurement instrument.

FIGS. 13a-13c show an example of a method using an auxiliary measurement instrument 70 as described above. The auxiliary measurement instrument 70 having assembly 73 arranged on the gimbal device 76 is positioned at a terrain point 78. Work is to be carried out at the terrain point 78 by means of a tool 79, in the example a drill. The handheld tool 79 has a working axis 79a, which is to be aligned in a specific direction for optimum work, in the example vertically (toward the floor). To ensure this optimum alignment or in other words to check the alignment, the laser light L of the targeting unit 75 targeting the terrain point 78 is used.

On its rear side, the tool 79 has a laser detector or a matte disk 79b, attached centrally around the working axis 79a. If the tool 79 is now aligned so that the laser beam L is incident on a central zone of the matte disk/the detector 79b, the user thus recognizes that the alignment is optimal. The central zone can comprise the entire matte disk/detector region, wherein a larger-area embodiment of the light-sensitive surface can be advantageous in order to first find/detect the laser beam at all before the optimum alignment. The accuracy of the alignment can optionally be produced by means of multiple zones which represent tolerance ranges of various levels, for example a tolerance of 1°, 2°, and 3°. If a detector is present, the alignment can be checked, for example by means of optical and/or acoustic signals.

Figure 14:
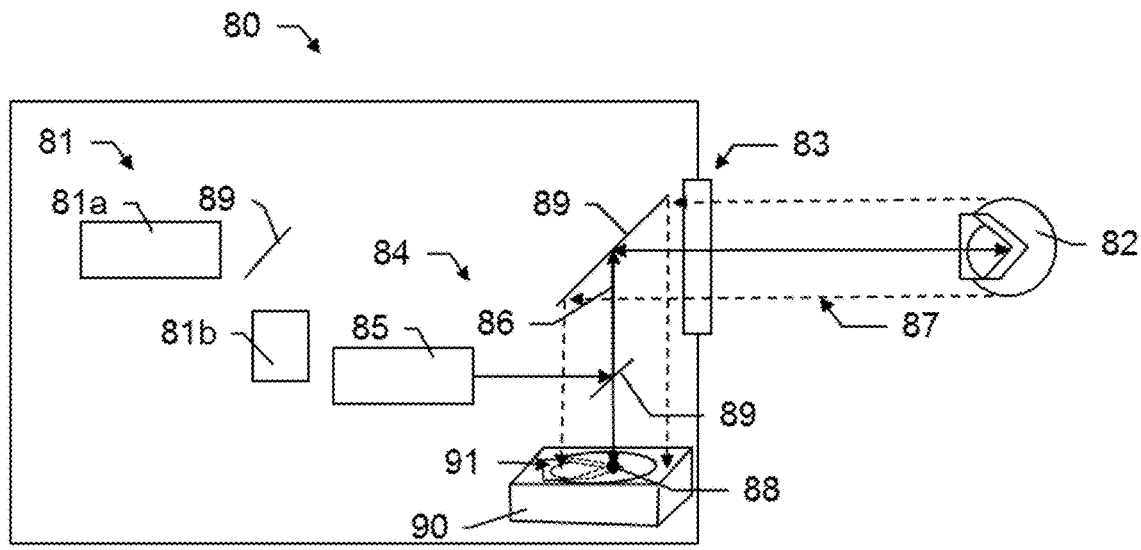
FIG. 14 shows an example of a surveying device having parallel provision of a direction to a target to be surveyed and an image of the target, FIG. 15 schematically shows the sequence of parallel acquisition of infrared radiation and visible radiation.

FIG. 14 shows an example of a surveying device 80 having parallel provision of a direction to a target 82 to be surveyed and an image of the target 82. The surveying device 80, for example a total station or a laser tracker, includes, as a component of a direction measuring module 84, an infrared radiation source 85, which generates illumination radiation 86, which, inter alia, illuminates the target 82, designed in the example as a retroreflector, by means of beam splitters 89. Infrared radiation 86 reflected from the target 82 is received by a receiving optical unit 83 and guided onto a sensor 90 (notwithstanding the remainder of the illustration, the sensor 90 is shown in a diagonal view). The two-dimensional image sensor 90 is sensitive to the wavelength of the infrared radiation 86 and is position sensitive, so that the location of the point of incidence 88 of the received radiation 86 on the sensor 90 is ascertainable, for example in a way known per se by ascertaining the focal point. A direction to the target 82 can be concluded on the basis of the location of the point of incidence 88. For example, on the basis of a deviation of the location from a defined center, which corresponds to a high accuracy central alignment on the target 82, a deviation of the target axis of the surveying device 80 from a desired alignment is concluded, which is also known under the term automated target recognition (ATR). In other words, an offset of the received infrared beam 86 from a zero position is ascertained on the sensor 90. By means of this measurable offset, a position difference between the center of the retroreflector 82 and the point of incidence of the infrared beam 86 on the reflector 82 can be determined and the alignment of the surveying device 80 can be corrected or tracked as a function of this deviation in such a way that the offset on the sensor 84 is reduced, in particular is "zero", and thus the beam or a target axis is aligned in the direction of the reflector center. Therefore, a high accuracy, finely targeted distance measurement to the target 82 is also enabled by means of a distance measuring module 81 having a radiation source 81a, which sends measurement radiation (not shown) (for example laser radiation) along the target axis to the target 82, so that reflected measurement radiation is detected using a detector 81b. Moreover, a 3D position of the target 82 can be ascertained from the offset and thus direction to the target in conjunction with the distance measurement.

Moreover, a progressive target tracking of the target 82 can be carried out by the tracking of the alignment and the position of the target 82 (direction and distance) can be progressively determined relative to the measurement device 80. The tracking can be implemented by means of an alignment change of a motorized movable deflection mirror provided for deflecting the light beam and/or by pivoting a targeting or beam deflection unit relative to a fixed base.

Alternatively to the illustration, a parallel illumination is carried out using infrared radiation 86, for example in that an IR radiation source is arranged directly on the optical unit 83, for example as a ring of IR-LEDs around the optical unit 83. The spatial direction to the target 82 is then determined, for example using a camera which receives reflected illumination radiation 86.

In contrast to the prior art, receiving optical unit 83 and sensor 90 are designed in such a way that simultaneously to the reception and acquisition of the infrared radiation 86 originating from the target 82, visible radiation 87 is also receivable (i.e., guidable onto the sensor 90) by means of the receiving optical unit 83 and the received visible radiation 87 is acquirable by the sensor 90 simultaneously with the infrared radiation 86. The visible light is receivable and acquirable with a spectral distribution in such a way that a color image can be generated therefrom.

Therefore, in parallel to the ascertainment of the offset point 88 or the determination of the direction to the target 82 based on the point 88, a camera or RGB image 91 of the target 82 can be generated on the basis of the light 87 originating from the target 82. In contrast to known surveying devices, at one time, in particular simultaneously, both infrared measurement radiation and also "normal" ambient light are acquired, so that in one work step, on the one hand, a target direction determination can be provided and also a camera image 91 of the target 82 can be provided by means of the same sensor 90, without the receiving optical unit 83 or the optical receiving path having to be changed for this purpose for one of the two tasks. Therefore, for example, the wavelength transmissivity does not have to be changed by means of switching on an optical wavelength filter, for example an IR filter, in order to provide ATR measurement and color image.

Figure 15:
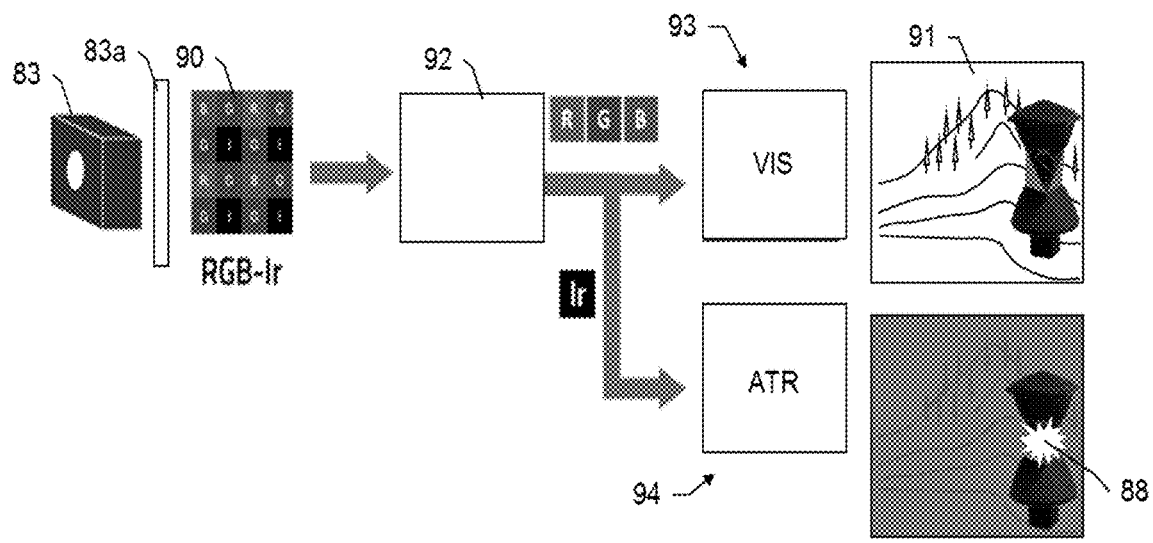

FIG. 15 solely schematically illustrates the sequence of parallel acquisition of infrared radiation and visible radiation having a broad color spectrum and also direction determination and image generation each based thereon. By means of the receiving optical unit 83, both types of radiation are guided onto the sensor 90 sensitive for both wavelength ranges, wherein the visible radiation is let through as a bandpass by means of a filter 83*a*, as well as an IR range selected with respect to the IR range of the IR illumination radiation (86 in preceding FIG. 14) or of the sensor.

The different radiation components (in the example IR and RGB) are processed (block 92), so that two sensor output signals or sensor signal components are generated. The optical image 91 of the target (or the target environment) is created using the first output signal 93. In parallel thereto, the direction to the target is ascertained (symbolized by the offset point 88) using the second output signal 94. Therefore, using the same optical system and in one procedure, on the one hand, surveying is carried out by means of IR radiation and also a color image 91 is generated. Optionally, in the image 91 of the target, the determined direction to the target is displayed overlaid, wherein the image 91 can be part of a live video stream.

Figure 16:
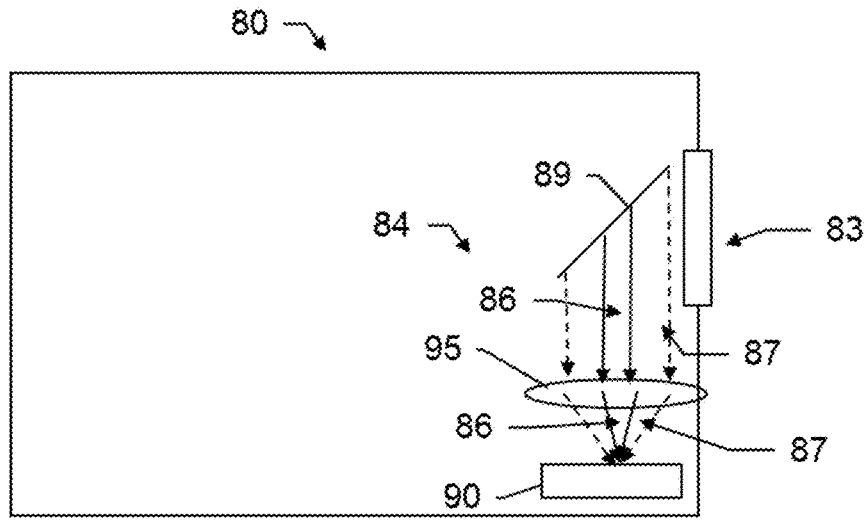
FIG. 16 shows a refinement of the embodiment of a surveying device according to FIG. 14.

FIG. 16 shows a refinement of the embodiment of a surveying device 80. For simpler illustration, in comparison to FIG. 14, all further elements were omitted except for receiving optical unit 83 and sensor 90. In contrast to the embodiment according to FIG. 14, the receiving optical unit 83 includes a correction lens 95. This is used to match the focus of the receiving optical unit 83 for the visible light 87 and the focus for the IR radiation 86 to one another in order to thus compensate for the wavelength dependence of the focusing. Both types of radiation 86, 87 or all spectral ranges can thus be imaged sharply on the sensor 90 at the same time. Therefore, both focused IR radiation 86 and also focused ambient light 87 are thus provided simultaneously, so that the IR point of incidence can be determined and a color image can be generated in one exposure procedure. Simultaneity of the two procedures is advantageous above all in the case of a moving target. An alternative to a unifying focus correction or a simultaneous recording of both types of radiation 86, 87 is described in following FIG. 17.

Figure 17:
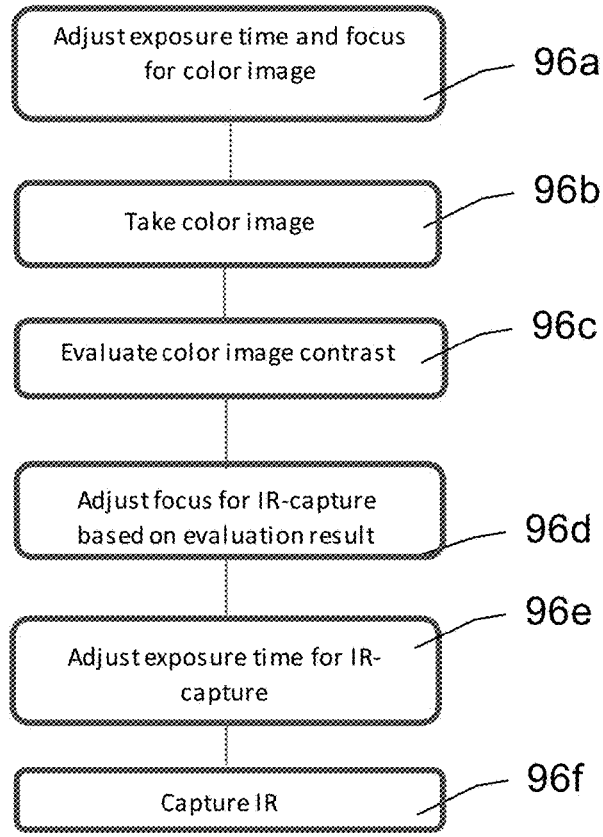
FIG. 17 shows a sequence, using which a camera image on the basis of the visible wavelengths and also an IR measurement are produced in one work step.

FIG. 17 schematically illustrates a sequence, using which a camera image is produced on the basis of the visible wavelengths and also an IR measurement is carried out in one work step. First, the surveying device is set to creating the color image in that the exposure time and the optical focus are appropriate or are optimally set for the visible wavelength range (96*a*). A camera image is then recorded (96*b*) using these parameter values of the receiving optical unit or the sensor. This image is subsequently evaluated (96*c*) in order to optimally set recording parameters for the acquisition of the IR radiation. In the example, the optical focus is set on the basis of the ascertained image contrast of the color image (96*d*). This can take place in a fully automated manner or a partially automated manner with user intervention and is advantageous in that such a color image generally has a good contrast value or the contrast is significantly clearer than in the case of the IR radiation. The image sharpness can thus be established with good reliability and used for the regulation.

Subsequently, the exposure time is set appropriately for an IR acquisition (96*e*). This can also be based on an evaluation of the color image. In any case, separate exposure procedures are advantageous in that the exposure durations are settable optimally for the respective type of radiation. The IR radiation is then acquired using the recording parameters set in this way (96*f*).

Setting of acquisition parameters optimized for the respective partial procedure is thus implemented using such acquisition occurring in direct succession of visible radiation and IR radiation. The sequence can in particular be part of a video stream in which a color recording and an IR recording each take place alternately.

Figure 18:
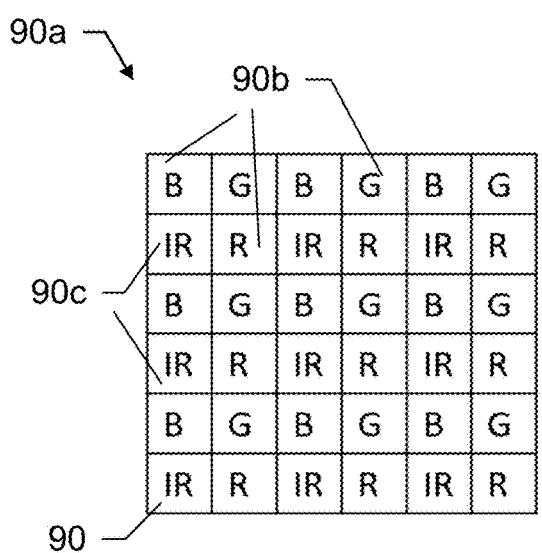
FIG. 18 shows an exemplary embodiment of a hybrid sensor.

FIG. 18 shows an exemplary embodiment of a hybrid sensor 90, using which infrared radiation for offset point determination and colored light for color image provision are acquirable simultaneously. In the example, the sensor 90 is embodied as a hybrid RGB-IR sensor 90 having a pixel array 90*a*, which includes the three channels 90*b* red, green, and blue and moreover an IR channel 90*c*. These are obtained, for example, by corresponding pixel filters, which only let the wavelengths or wavelength range of the desired spectral component R, G, B or IR pass, wherein the IR pixel filter transmits, for example, radiation in the wavelength range from 800-950 nm or specifically at wavelengths of 780 nm or 850 nm and absorbs all of the light in the visible spectrum. During the image generation, the respective missing color channels of a pixel are preferably compensated for by correlating the missing color components by way of the adjacent pixels which acquire the corresponding colors. Such a compensation is not necessary for the ATR measurement, since the point of incidence is ascertainable, for example by focal point formation as described.

Figure 19:
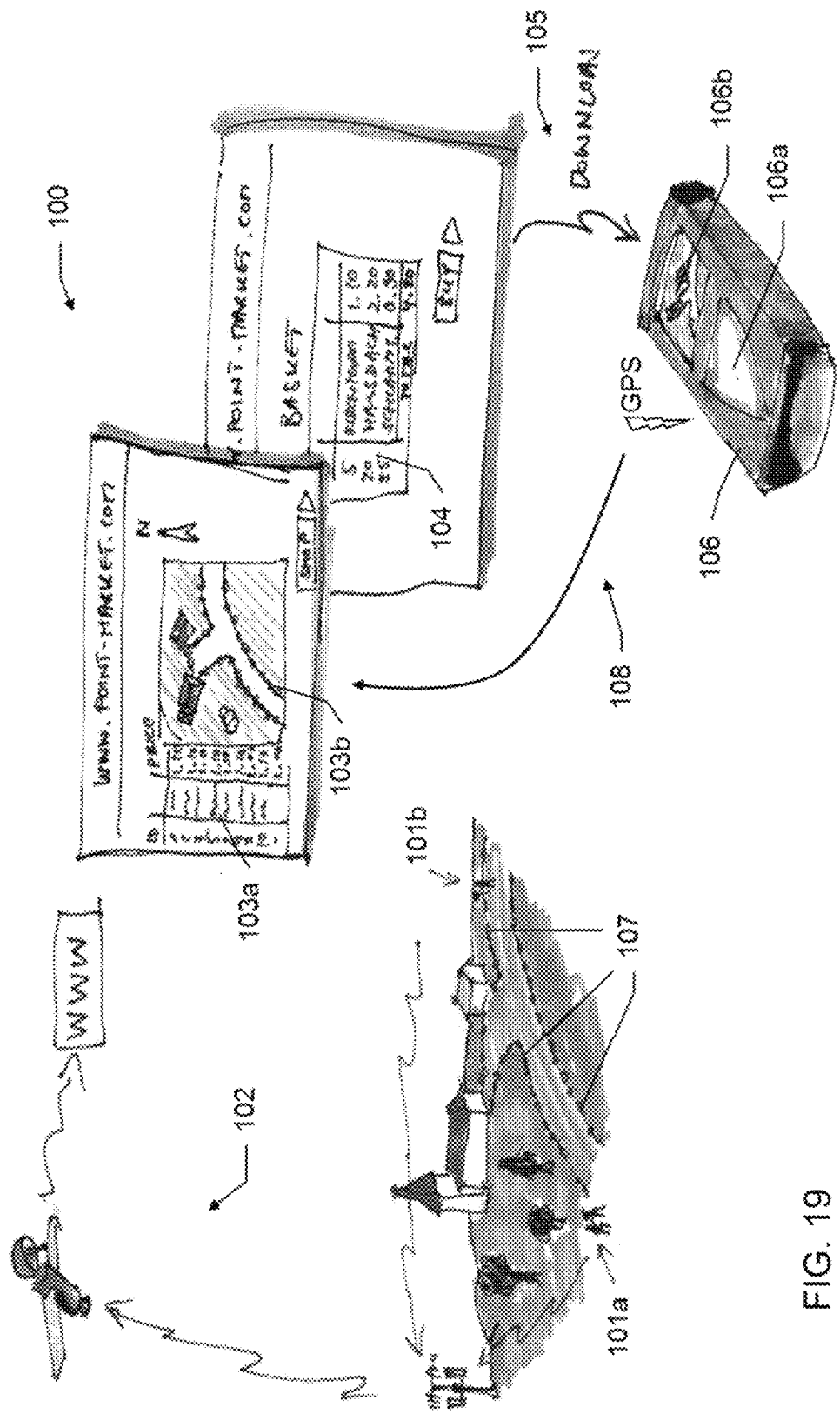
FIG. 19 shows an example of a method for buying and selling geodetic data via a computer network platform.

FIG. 19 shows an example of a method for buying and selling geodetic data via a computer network platform 100. The left part of FIG. 19 schematically shows how terrain points 107 are surveyed by means of the surveying devices 101*a* and 101*b*. Geodetic data are thus generated which include the absolute coordinates of the terrain points 107, for example with respect to the WGS84 or ETRS89 reference system. The geodetic data include optional further data. Examples of such metadata are the time or the date of the measurement, the model or type of surveying device used, i.e., for example, tachymeter or laser scanner, reflector-less or with reflector, etc. The accuracy or uncertainty of the coordinates or the creator/the source of the geodetic data can also be a component thereof (see also FIG. 20).

The geodetic data thus generated are transferred in the example by means of the Internet to a data exchange platform 100. This upload represents the sale of the geodetic data or the offer thereof for sale. The platform 100 stores the geodetic data of the terrain points 107 as a function of the respective point coordinates, i.e., the geodetic data are assigned via the coordinates contained therein. The geodetic data are thus retrievable on the basis of the coordinates. In addition to the mentioned metadata, further metadata can be added to the geodetic data by the platform 100, for example a coordinate history, thus the trend of the coordinates of a terrain point if multiple measurements of various dates for the same point are present in the stored database.

To retrieve geodetic data, a (potential) buyer registers via the network on the platform 100 and communicates for which location or for which terrain point he wishes data, for example in that he specifies his location coordinates directly or communicates another type of location designation (for example address, property parcel number, etc.) which makes his location and thus coordinates of his residence identifiable. On the basis of such a coordinate-related query, the platform 100 provides the corresponding geodetic data, i.e., the data which match on the basis of their coordinates with the location coordinates or are classified as associated. In the example, the provision is carried out in the form of a list 103*a* and also graphically as markings 103*b*, which are embedded in a map view of the location or the coordinates.

The user then selects the geodetic data which he wishes to purchase and subsequently downloads the purchased data on his surveying device 106, where they are graphically displayed on a display 106*b* of the device 106, for example. Display of data, download, or upload can also not be carried out here by the actual surveying device 106, thus for example a total station, but by a display and control unit connected or connectable thereto, for example a smart phone or tablet. I.e., a geodetic surveying system includes in such cases, for example, a tachymeter and a smart phone, wherein both devices communicate with one another and the communication to the platform takes place by means of the smart phone.

As an advantageous option, the download or purchase 105 is carried out simply by a single user input, for example by simply pressing an operating button 106*a* of the surveying device 106 or of a smart phone or tablet connected thereto. The upload or sale 102 of geodetic data stored in the surveying device 101*a* or 101*b* can also be able to be triggered by a single keypress. The platform 100 is thus used as a trading market using which geodetic data can be traded in a simple and direct manner.

The purchase of geodetic data can furthermore be automated in that the location of the buyer or the surveying system 106 is automatically ascertained, for example by means of GPS, and transmitted to the market platform 100 (illustrated by symbol 108 in FIG. 19), so that the geodetic data matching with the location are downloaded automatically upon button press, for example data of all terrain points in a radius of 50 m, wherein additional, previously set filters can be taken into consideration (thus, for example, that only coordinates are purchased which meet specific quality criteria/measurement accuracies or are compatible with the type of surveying device).

Such a transfer and consideration of location 108 or model/type of device optionally already takes place alternatively or additionally during the provision 103*a/b* of the geodetic data, so that only those data are offered which match with the location and/or specific surveying device 106. A preselection or also adaptation of the geodetic data facilitates the final selection for the user. An adaptation can relate here, for example, to the type of the presentation of the data, which is then tailored specifically to the requesting device.

As a further option (not shown), the platform 100 ascertains or calculates, for the terrain points 104 requested by the buyer, a surveying location optimal for this point set 104 and proposes this surveying location to the user. The system can also optionally propose terrain points adjoining one or more requested or purchased terrain points. The buyer thus optionally receives further assistance on the basis of the geodetic data purchased by him, which can facilitate a surveying task building on the downloaded already surveyed terrain points.

In a further refinement (not shown) of the method or the platform 100, the buyer automatically receives a message as soon as an update of geodetic data already purchased by him is available, for example more recent coordinates for downloaded points are thus present. For example, stationing measurements on the basis of multiple known points can be used to update the point information. A warning is also optionally output automatically to the user if it is to be assumed, for example due to bad weather or earth movements, that the already purchased data no longer correspond to reality. For example, the platform 100 is connected to a meteorological or seismological data provider, so that severe environmental influences in a specific terrain region are noted, which have or could have influence on terrain points. A notice to the user of the platform 100 accordingly takes place that his data are or could be out of date, thus the stored and downloaded coordinates (potentially) deviate from the real coordinates.

Figure 20:
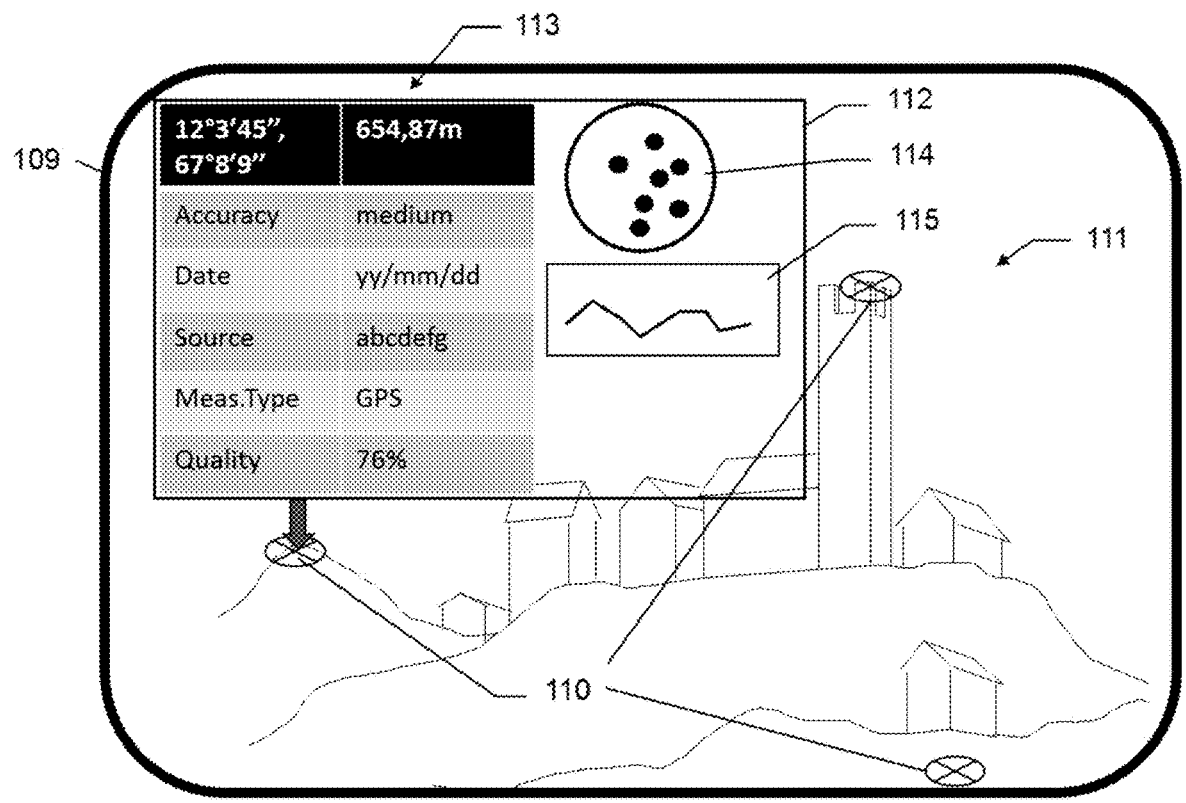
FIG. 20 shows an example of geodetic data.

FIG. 20 shows an example of geodetic data 113-115 which can be requested via the data trading platform. In the example, a display 109, for example of a total station, can be seen in which a 3D view or a live camera image 111 of the surveying environment at the location of the surveying device can be seen. Three graphic markings 110 of terrain points, the coordinates of which have been downloaded by the platform, are overlaid on the image 111 in the example. In addition to the coordinates, further geodetic data 113-115 have been provided or purchased by means of the platform, which are linked to the terrain points 110 and are displayable, for example by clicking on the respective marking. In the example, the additional data for a point are displayed in a display window 112.

The display window 112 contains, on the one hand, a table 113 which contains, in addition to the coordinates of the point, specifications on its accuracy, measurement time, source, measurement method, and quality. The quality specification is based, for example, on the relevant terrain point having been surveyed by multiple surveyors, thus a plurality of coordinates specifications for the same point are stored in the platform. In addition to this data table 113, a spatial distribution of the plurality of the coordinates specifications is shown by the graphic 114 in the window. In addition, the time trend of the coordinates is illustrated in a diagram 115, i.e., the respective measurement results as a function of the respective measurement date.

The user or buyer thus receives, in addition to the actual surveying values of the points, many further items of information thereon. It is thus not only made possible in a simple manner using the described embodiments for a surveyor to load points which have already been surveyed earlier directly onto his surveying device immediately and on location, without having to input them in a time-consuming manner by hand, for example. As an additional advantage, further geodetic data on the points are provided, which enable, for example a deliberate selection of the points to be purchased that is optimal for the required surveying task and in addition a further judgment or more targeted/optimized use of the purchased points 110 by way of the metadata also supplied.

Figure 21:
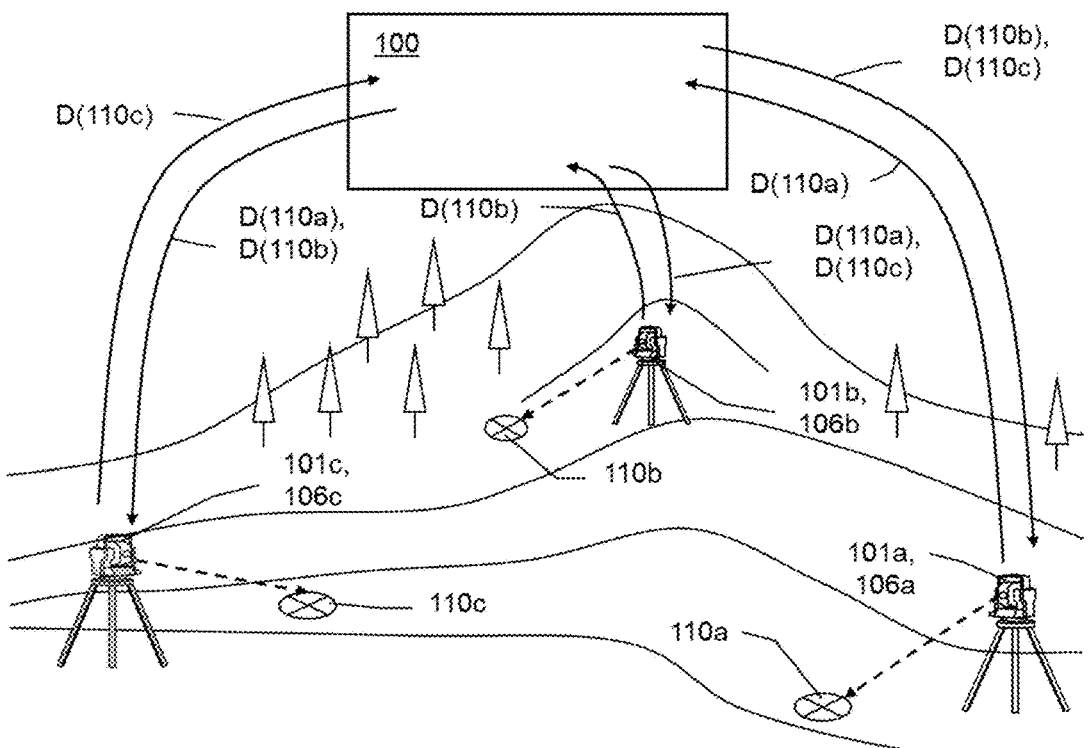
FIG. 21 shows a surveying group provided by means of the platform.

FIG. 21 shows an example of a surveying group which is enabled by means of the data exchange platform 100. In the example, three surveying devices 101*a*/106*a*-101*c*/106*c* are connected in a measurement environment, which function both as a device 101*a*-101*c* offering geodetic data and also as a device 106*a*-106*c* obtaining geodetic data. For example, the surveying device 101*c* surveys a terrain point 110*c* and immediately loads its data D(110*c*) via the Internet onto the platform 100. The devices 101*a* and 101*b* each also survey terrain points 110*a*, 110*b* and transfer the corresponding geodetic data D(110*a*), D(110*b*) directly to the platform 100.

The data D(110*a*-110*c*) which have arrived at the platform 100 are then provided in real time for the three devices logged into the platform 100 and registered as a group or buyer-seller combination and relayed to the respective other devices. A transfer of the data D(110*a*) just uploaded from the surveying device 101*a* to the two other devices 106*b*, 106*c* and a transfer of the data D(110*b*) to the devices 106*a*, 106*c*, etc. thus take place automatically.

Thus, an exchange of the survey data D(110*a-c*) takes place in real time and on location, so that at all locations, all data D(110*a-c*) or points 110*a*-110*c* generated in the group are present immediately. Synchronized, parallel work of multiple surveyors is thus enabled, wherein already surveyed points 110*a-c* can be used for further referencing. Such a data exchange is also an example that a buy-sell transaction of geodetic data D(110*a-c*) can run free of charge or as a barter or barter trade with geodetic data as the "currency".

It is obvious that these illustrated figures only schematically show possible exemplary embodiments. The various approaches can also be combined according to the invention with one another and with surveying devices and measurement methods of the prior art.

The invention claimed is:

1. A method for displaying desired positions in a live image of a construction site, comprising:
    recording at least one position-referenced image of the construction site,
    linking at least one desired position to the position-referenced image, storing the position-referenced image together with desired position linkage in an electronic memory,
    recording a live image of the construction site, wherein the live image and the position-referenced image at least partially represent an identical detail of the construction site,
    retrieving the stored position-referenced image from the memory,
    fitting the position-referenced image with the live image, so that the desired position linked to the position-referenced image can be overlaid in a position-faithful manner on the live image,
    position-faithful display of the desired position as a graphic marking in the live image.

2. The method as claimed in claim 1, wherein the linkage of the at least one desired position is produced in the form of an image layer overlaid on the position-referenced image having graphic markings of the desired position and the position-faithful display of the at least one desired position in the live image is carried out by overlaying the image layer in the live image.

3. The method as claimed in claim 1, wherein the recording of the at least one position-referenced image is carried out by means of a surveying device which has a distance and direction measuring functionality.

4. The method as claimed in claim 1, wherein the recording and display of the live image of the construction site is carried out by means of a handheld mobile device.

5. The method as claimed in claim 1, wherein the fitting is carried out by means of template matching, using marking objects attached for this purpose in the construction site and imaged both in the position-referenced image and also in the live image.

6. The method as claimed in claim 1, wherein:
    the desired position is used to execute a construction activity,
    an actual status image of the construction site is recorded after completed construction activity,
    position referencing of the actual status image is carried out on a basis of the position-referenced image,
    the position-referenced actual status image is stored in the memory.

7. The method as claimed in claim 6, wherein an estimation of the accuracy of the position reference of the actual status image is carried out and if an accuracy below a defined threshold is present, a warning is automatically output to a user.

8. The method as claimed in claim 1, wherein the position-referenced image and the live image are three-dimensional images.

9. The method as claimed in claim 1, wherein:
    a comparison of the live image to the position-referenced image is carried out in such a way that construction site elements are recognized in the live image, which are not imaged in the position-referenced image or are imaged at the incorrect point in the live image, and
    these construction site elements are graphically marked in the live image.

10. A measurement system for surveying or staking out measurement points having surveying functionality, wherein the surveying system comprises:
    a room-based surveying device which can be absolutely located,
    a handheld auxiliary measurement instrument, wherein the auxiliary measurement instrument comprises:
    a handheld carrier,
    a mobile computer terminal supported by the carrier and including a display screen and a first camera,
    means for determining or making determinable a pose of the auxiliary measurement instrument,
    wherein upon execution of the surveying functionality:
    the pose of the auxiliary measurement instrument and thus the computer terminal relative to the surveying device is uniquely determined, wherein at least one pose-dependent degree of freedom is determined by the surveying device, a measurement environment image is recorded by means of the first camera, and the measurement environment image is displayed on the display screen, wherein at least one measurement point is displayed overlaid faithfully in position on the measurement environment image using the determined pose of the computer terminal.

11. The measurement system as claimed in claim 10, wherein the carrier comprises a gimbal mount for pose stabilization of the computer terminal, wherein the gimbal mount is designed as an active gimbal mount and is used to deliberately set an alignment of the computer terminal.

12. The measurement system as claimed in claim 11, wherein upon execution of the surveying functionality, by means of the active gimbal mount:

a measurement point to be staked out is automatically targeted by the computer terminal or in the measurement environment image, a measurement point to be surveyed is manually marked by a user in the measurement environment image and the computer terminal is automatically aligned on the measurement point to be surveyed based on the image marking.

13. The measurement system as claimed in claim 10, wherein the surveying functionality is designed in such a way that by means of the computer terminal, the position of at least one measurement point to be surveyed of the measurement environment is measured relative to the computer terminal and on a basis of this position and the ascertained pose of the auxiliary measurement instrument, an absolute position of the measurement point is ascertained, and the point position measurement is carried out by the computer terminal based on a measurement beam or photogrammetrically, or the surveying functionality is designed in such a way that scanning surveying of a plurality of measurement points takes place.

14. The measurement system as claimed in claim 10, wherein the auxiliary measurement instrument comprises at least one marker for oriented marking and the surveying functionality is designed in such a way that, on a basis of the absolute locating of the surveying device and the ascertained relative pose of the auxiliary measurement instrument, at least one measurement point to be staked out is marked in a position-faithful manner on a surface of the measurement environment by means of the marker.

15. The measurement system as claimed in claim 10, wherein the surveying functionality is designed in such a way that, based on the absolute locating of the surveying device and the ascertained relative pose of the auxiliary measurement instrument, at least one desired position retrieved from a memory is overlaid on the measurement environment image as the measurement point to be staked out.

16. The measurement system as claimed in claim 10, wherein:

a body, which is spherical or polyhedral, having optical one-to-one code distributed on a surface of the body, is arranged on the carrier, whereby by means of image processing of an image of the body recorded by a second camera arranged on the surveying device, decoding is carried out in such a way that an orientation and distance of the carrier relative to the surveying device is determined one-to-one, a direction of the target axis aligned on the auxiliary measurement instrument is determined, the pose of the auxiliary measurement instrument is determined on basis of the orientation, distance, and direction.

17. A room-based surveying system comprising:

a surveying device, wherein the surveying device comprises:

a distance and direction measuring functionality, whereby a distance and direction to a target to be surveyed in a measurement environment of the surveying device is determinable in the direction of a target axis of the surveying device, at least one drive for automated pivoting of the target axis, and comprises at least one camera aligned in the direction of the target axis by means of which an image of a detail of the measurement environment is recordable, a display screen, a controller having evaluation functionality, wherein the controller comprises a target acquisition function, upon the execution of which:

an overview image of the measurement environment is recorded from a location of the surveying device, the overview image is displayed on the display screen, a manual selection of a target region containing the target on a basis of the displayed overview image by a user is registered, the target axis is automatically aligned in the direction of the target region by means of the drive on basis of the registered manual definition as a rough alignment on the target, an image of the target region, which corresponds to an enlarged detail from the overview image, is recorded by means of the camera aligned in the direction of the target axis, a manual selection of the target on the basis of the displayed target region image is registered, the target axis is automatically aligned on the target by means of the drive on basis of the registered manual target selection, so that the target can be surveyed by means of the distance and direction measuring functionality.

18. The surveying system as claimed in claim 17, wherein the surveying device comprises:

a base, a targeting unit which defines the target axis and is pivotable in relation to the base around at least one axis, at least one angle meter and an angle measuring functionality for measuring the alignment of the target axis, a distance meter for measuring a distance to the target along the target axis, and a controller having single-point determination functionality, upon the execution of which, controlled by the controller, a spatial position of the target is determined based on the measured alignment of the target axis and the distance between target and surveying device.

19. The surveying system as claimed in claim 17, wherein the display screen is designed for operating the surveying device and for displaying and manipulating measurement data, wherein the display screen and the surveying device are separate units or the display screen is designed as separable from the surveying device.

20. The surveying system as claimed in claim 17, wherein upon the execution of the target acquisition function of the controller, computer-implemented steps are carried out as follows:
- to assist the manual target region definition or the manual target selection, potential targets are displayed in the displayed overview image or target region image, by means of overlaid graphic markings, wherein the potential targets are provided by at least one of:
  - retrieving known targets of the measurement environment stored in an electronic memory,
  - automatically recognizing retroreflective targets on a basis of the overview image or target region image, wherein, for the automatic recognition, the measurement environment is illuminated using illumination radiation during the recording of the overview image or target region image, and
  - automatically recognizing distinctive measurement environment points that can be targeted in the overview image or target region image.

21. The surveying system as claimed in claim 17, wherein the display screen is touch-sensitive and the selection of the target region and selection of the target are carried out by touching the display screen displaying the overview image or the target region image, wherein the manual selection of the target region is automatically assisted in that a region around a contact point in the overview image is automatically defined by the touch, wherein a size of the region:
- is automatically established as a function of measurement data or
- is variable in steps by multiple touches of the contact point.

22. The surveying system as claimed in claim 17, wherein upon the execution of the target acquisition function of the controller, computer-implemented steps are carried out as follows:
- the manual selection of the target is automatically assisted in that a zone around a contact point in the target region image is activated by the touch, and the target is automatically recognized and selected within this zone.

23. The surveying system as claimed in claim 17, wherein upon the execution of the target acquisition function of the controller, computer-implemented steps are carried out as follows:
- a zoom function is automatically activated to define a target region or select the target.

* * * * *